US012659122B2

(12) United States Patent
Hao et al.

(10) Patent No.: US 12,659,122 B2
(45) Date of Patent: Jun. 16, 2026

(54) CRITERIA FOR REPORTING CHANNEL STATUS INFORMATION

(71) Applicant: QUALCOMM Incorporated, San Diego, CA (US)

(72) Inventors: Chenxi Hao, Beijing (CN); Mostafa Khoshnevisan, San Diego, CA (US); Yu Zhang, San Diego, CA (US); Xiaoxia Zhang, San Diego, CA (US); Fang Yuan, Beijing (CN); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 18/252,519

(22) PCT Filed: Jan. 15, 2021

(86) PCT No.: PCT/CN2021/071995
§ 371 (c)(1),
(2) Date: May 10, 2023

(87) PCT Pub. No.: WO2022/151304
PCT Pub. Date: Jul. 21, 2022

(65) Prior Publication Data
US 2023/0421332 A1      Dec. 28, 2023

(51) Int. Cl.
*H04W 4/00*        (2018.01)
*H04L 1/08*        (2006.01)
*H04L 5/00*        (2006.01)
(52) U.S. Cl.
CPC .............. *H04L 5/0057* (2013.01); *H04L 1/08* (2013.01)

(58) Field of Classification Search
CPC ....... H04L 5/0057; H04L 1/08; H04L 1/0026; H04L 1/0027; H04L 5/0053; H04L 5/0094
(Continued)

(56) References Cited

U.S. PATENT DOCUMENTS 10,652,885 B2    5/2020  Hosseini et al.
2019/0053084 A1*  2/2019  Hosseini ........... H04W 72/1273
(Continued)

FOREIGN PATENT DOCUMENTS

CN        112075043 A      12/2020
WO      WO-2018204467      11/2018

OTHER PUBLICATIONS

Ericsson: "Summary of Views on CSI Reporting V4", 3GPP TSG-RAN WG1 Meeting #94bis, Chengdu, P.R. China, Oct. 6-12, 2018, R1-1812015, Oct. 12, 2018 (Oct. 12, 2018), pp. 1-35, section 5.2.1.4.2, 5.2.3.
(Continued)

*Primary Examiner* — Chuong T Ho
(74) *Attorney, Agent, or Firm* — QUALCOMM Incorporated

(57) ABSTRACT

Various aspects of the present disclosure generally relate to wireless communication. In some aspects, a user equipment (UE) may determine a transmission of a channel status information (CSI) report based at least in part on receiving a CSI request via PDCCH repetitions, based at least in part on transmitting the CSI report via PUCCH repetitions, or based at least in part on transmitting the CSI report via PUSCH repetitions. The UE may determine, based at least in part on the determined transmission of the CSI report, CSI processing criteria including one or more of a CSI processing timeline, a CSI processing unit occupation duration, a resource and port occupation duration, or a CSI reference
(Continued)

resource slot. The UE may selectively transmit the CSI report based at least in part on the determined CSI processing criteria. Numerous other aspects are described.

28 Claims, 19 Drawing Sheets

(58) Field of Classification Search
USPC ................................................. 370/329, 330
See application file for complete search history.

(56)                       References Cited

U.S. PATENT DOCUMENTS

| | | | | |
|---|---|---|---|---|
| 2019/0159219 A1* | 5/2019 | Hosseini | ............... | H04W 72/56 |
| 2019/0306922 A1 | 10/2019 | Xiong et al. | | |
| 2020/0052763 A1* | 2/2020 | Kim | .................... | H04W 72/542 |
| 2020/0107319 A1* | 4/2020 | Bagheri | ................ | H04W 72/23 |
| 2021/0028844 A1* | 1/2021 | Song | .................... | H04W 52/02 |
| 2022/0103209 A1* | 3/2022 | Hao | ...................... | H04W 24/10 |
| 2022/0256458 A1* | 8/2022 | Noh | .......................... | H04B 7/06 |
| 2023/0171070 A1* | 6/2023 | Bhamri | ................. | H04L 1/0027 |
| | | | | 370/329 |
| 2023/0208489 A1* | 6/2023 | Bhamri | ................. | H04L 1/0027 |
| | | | | 370/329 |
| 2024/0072866 A1* | 2/2024 | Oteri | .................... | H04W 72/23 |

OTHER PUBLICATIONS

International Search Report and Written Opinion—PCT/CN2021/071995—ISA/EPO—Sep. 28, 2021.

* cited by examiner

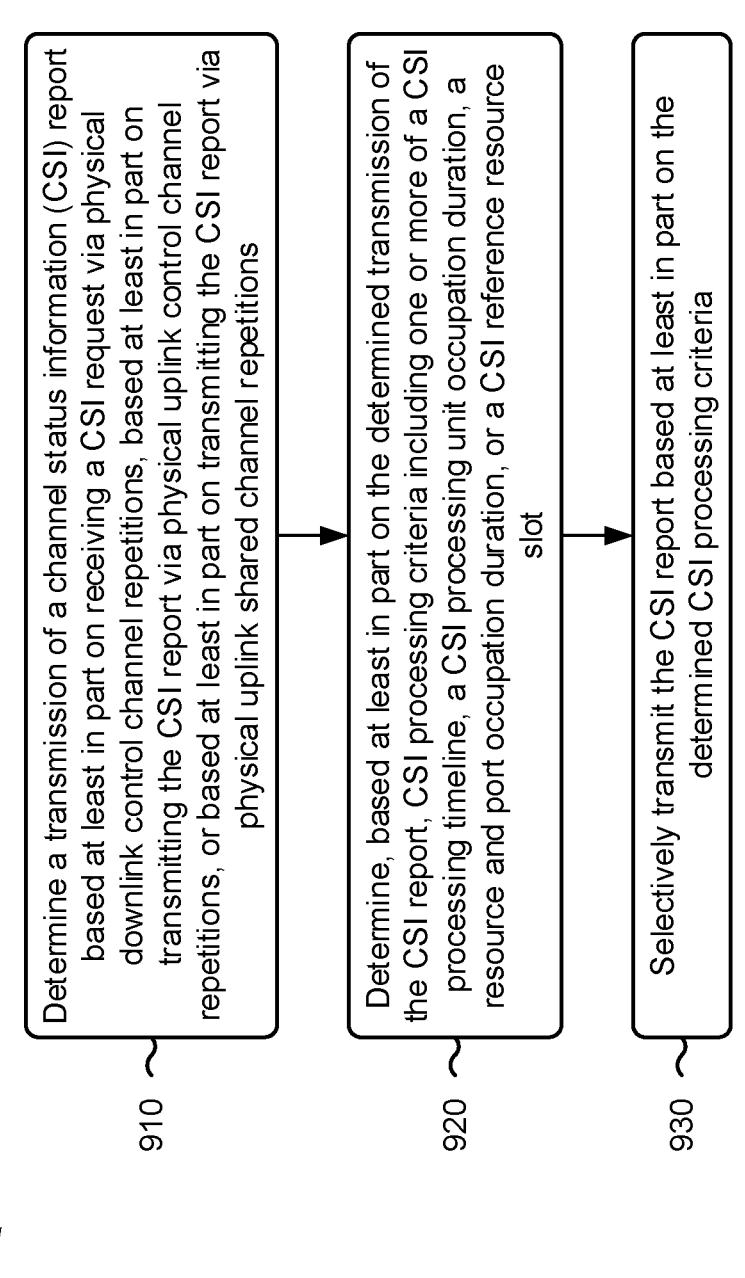

Determine a transmission of a channel status information (CSI) report based at least in part on receiving a CSI request via physical downlink control channel repetitions, based at least in part on transmitting the CSI report via physical uplink control channel repetitions, or based at least in part on transmitting the CSI report via physical uplink shared channel repetitions

910

Determine, based at least in part on the determined transmission of the CSI report, CSI processing criteria including one or more of a CSI processing timeline, a CSI processing unit occupation duration, a resource and port occupation duration, or a CSI reference resource slot

920

Selectively transmit the CSI report based at least in part on the determined CSI processing criteria

CRITERIA FOR REPORTING CHANNEL STATUS INFORMATION

CROSS-REFERENCE TO RELATED APPLICATION

This Patent Application is a 371 national stage of PCT Application No. PCT/CN2021/071995 filed on Jan. 15, 2021, entitled "CRITERIA FOR REPORTING CHANNEL STATUS INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for determining criteria for reporting channel status information (CSI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method for wireless communication performed by a UE includes determining a transmission of a channel status information (CSI) report based at least in part on receiving a CSI request via physical downlink control channel (PDCCH) repetitions, based at least in part on transmitting the CSI report via physical uplink control channel (PUCCH) repetitions, or based at least in part on transmitting the CSI report via physical uplink shared channel (PUSCH) repetitions; determining, based at least in part on the determined transmission of the CSI report, CSI processing criteria including one or more of a CSI processing timeline, a CSI processing unit (CPU) occupation duration, a resource and port occupation duration, or a CSI reference resource slot; and selectively transmitting the CSI report based at least in part on the determined CSI processing criteria.

In some aspects, a UE for wireless communication includes a memory; and one or more processors operatively coupled to the memory, the memory and the one or more processors configured to: determine a transmission of a CSI report based at least in part on receiving a CSI request via PDCCH repetitions, based at least in part on transmitting the CSI report via PUCCH repetitions, or based at least in part on transmitting the CSI report via PUSCH repetitions; determine, based at least in part on the determined transmission of the CSI report, CSI processing criteria including one or more of a CSI processing timeline, a CPU occupation duration, a resource and port occupation duration, or a CSI reference resource slot; and selectively transmit the CSI report based at least in part on the determined CSI processing criteria.

In some aspects, a non-transitory computer-readable medium storing a set of instructions for wireless communication includes one or more instructions that, when executed by one or more processors of a UE, cause the UE to: determine a transmission of a CSI report based at least in part on receiving a CSI request via PDCCH repetitions, based at least in part on transmitting the CSI report via PUCCH repetitions, or based at least in part on transmitting the CSI report via PUSCH repetitions; determine, based at least in part on the determined transmission of the CSI report, CSI processing criteria including one or more of a CSI processing timeline, a CPU occupation duration, a resource and port occupation duration, or a CSI reference resource slot; and selectively transmit the CSI report based at least in part on the determined CSI processing criteria.

In some aspects, an apparatus for wireless communication includes means for determining a transmission of a CSI report based at least in part on receiving a CSI request via PDCCH repetitions, based at least in part on transmitting the CSI report via PUCCH repetitions, or based at least in part on transmitting the CSI report via PUSCH repetitions; means for determining, based at least in part on the determined transmission of the CSI report, CSI processing criteria including one or more of a CSI processing timeline, a CPU occupation duration, a resource and port occupation duration, or a CSI reference resource slot; and means for selectively transmitting the CSI report based at least in part on the determined CSI processing criteria.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 9 is a diagram illustrating an example process associated with determining criteria for reporting channel status information, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
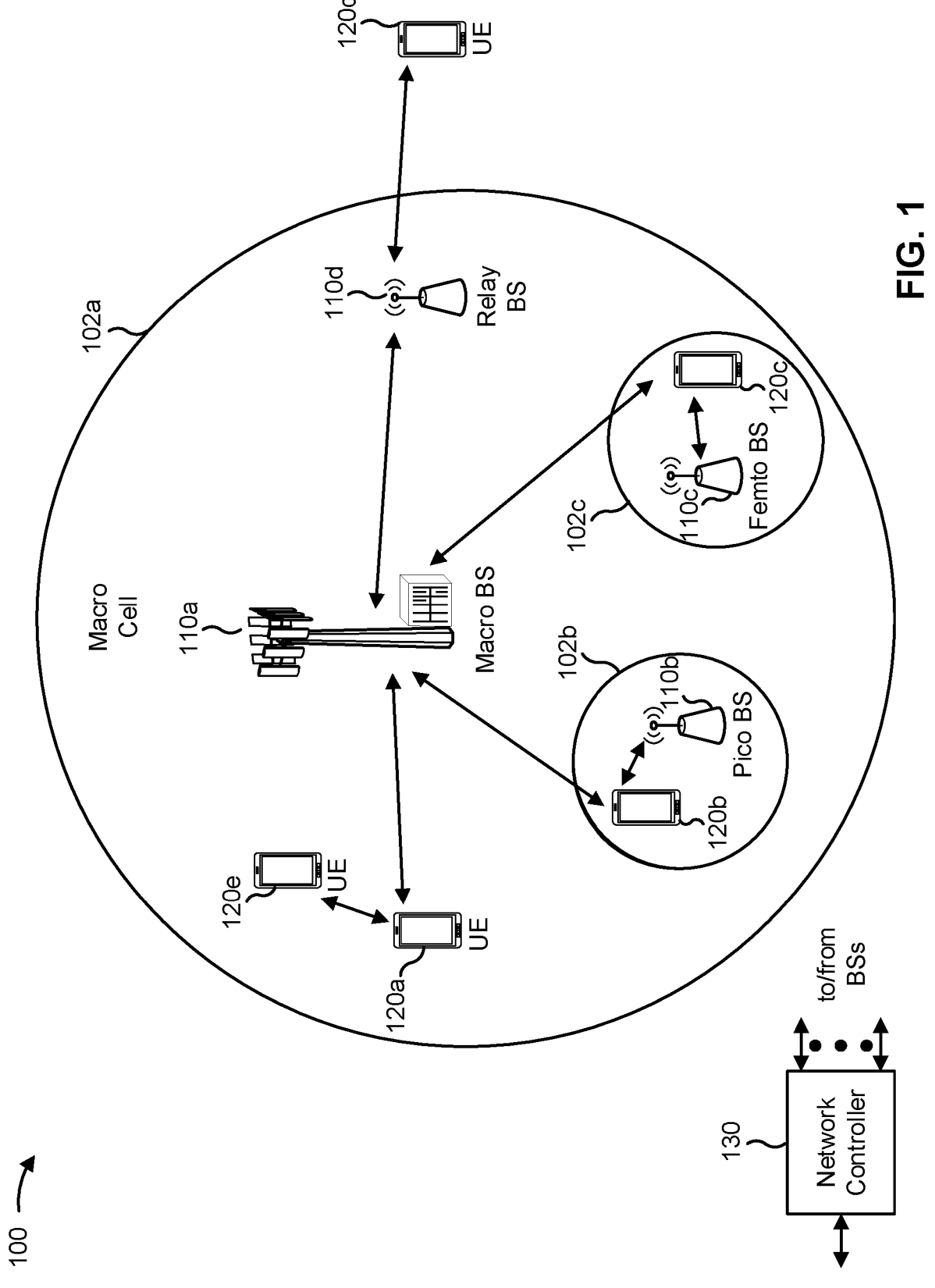
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
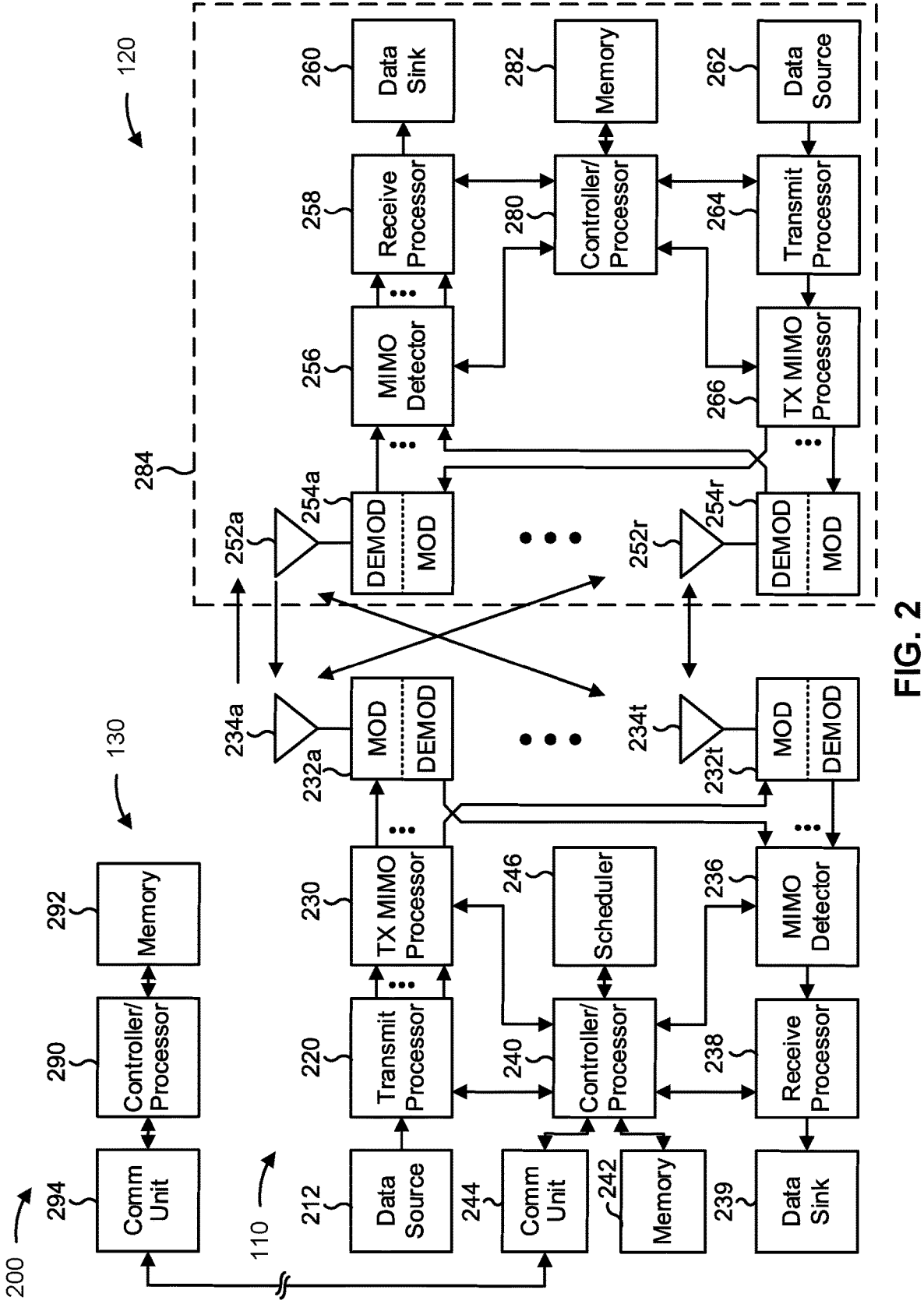
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-10.

Controller/processor 240 of base station 110, controller/processor 280 of UE 120, and/or any other component(s) of FIG. 2 may perform one or more techniques associated with determining criteria for reporting CSI, as described in more detail elsewhere herein. For example, controller/processor 240 of base station 110, controller/processor 280 of UE 120, and/or any other component(s) of FIG. 2 may perform or direct operations of, for example, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some aspects, executing instructions may include running the instructions, converting the instructions, compiling the instructions, and/or interpreting the instructions, among other examples.

In some aspects, the UE (e.g., UE 120) includes means for determining a transmission of a CSI report based at least in part on receiving a CSI request via PDCCH repetitions, based at least in part on transmitting the CSI report via PUCCH repetitions, or based at least in part on transmitting the CSI report via PUSCH repetitions; means for determining, based at least in part on the determined transmission of the CSI report, CSI processing criteria including one or more of a CSI processing timeline, a CPU occupation duration, a resource and port occupation duration, or a CSI reference resource slot; and/or means for selectively transmitting the CSI report based at least in part on the determined CSI processing criteria. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining whether a duration of the CSI processing timeline, starting at a time associated with the PDCCH repetitions and ending at a time associated with an uplink channel carrying the CSI report, is equal to or greater than a threshold duration when the transmission of the CSI report is determined to be based at least in part on receiving the CSI request via PDCCH repetitions, wherein means for selectively transmitting the CSI report includes means for transmitting the CSI report when the duration of the CSI processing timeline is determined to be equal to or greater than the threshold duration.

In some aspects, the UE includes means for determining that the CPU occupation duration is to start from an end of a first PDCCH repetition, from among the PDCCH repetitions, when the transmission of the CSI report is determined to be based at least in part on receiving the CSI request via PDCCH repetitions.

In some aspects, the UE includes means for determining that the CPU occupation duration is to start from an end of a last PDCCH repetition, from among the PDCCH repetitions, when the transmission of the CSI report is determined to be based at least in part on receiving the CSI request via PDCCH repetitions.

In some aspects, the UE includes means for determining that the CPU occupation duration is to start from an end of a last PDCCH repetition, from among the PDCCH repetitions, a duration from the end of the last PDCCH repetition to an uplink channel carrying the CSI report being equal to or greater than a threshold quantity of symbols, when the transmission of the CSI report is determined to be based at least in part on receiving the CSI request via PDCCH repetitions.

In some aspects, the UE includes means for determining that the CPU occupation duration is to end in association with a first configured PUCCH repetition, from among the PUCCH repetitions, or a first actual PUCCH repetition, from among the PUCCH repetitions, when the transmission of the CSI report is determined to be based at least in part on transmitting the CSI report via PUCCH repetitions.

In some aspects, the UE includes means for determining that the CPU occupation duration is to end in association with a last configured PUCCH repetition, from among the PUCCH repetitions, or a last actual PUCCH repetition, from among the PUCCH repetitions, when the transmission of the CSI report is determined to be based at least in part on transmitting the CSI report via PUCCH repetitions.

In some aspects, the UE includes means for determining that the CPU occupation duration is to end in association with a first scheduled PUSCH repetition, from among the PUSCH repetitions, or a first actual PUSCH repetition, from among the PUSCH repetitions, when the transmission of the CSI report is determined to be based at least in part on transmitting the CSI report via PUSCH repetitions.

In some aspects, the UE includes means for determining that the CPU occupation duration is to end in association with a last scheduled PUSCH repetition, from among the PUSCH repetitions, or a last actual PUSCH repetition, from among the PUSCH repetitions, when the transmission of the CSI report is determined to be based at least in part on transmitting the CSI report via PUSCH repetitions.

In some aspects, the UE includes means for determining that the resource and port occupation duration is to end in association with a first configured PUCCH repetition, from among the PUCCH repetitions, or a first actual PUCCH repetition, from among the PUCCH repetitions, when the transmission of the CSI report is determined to be based at least in part on transmitting the CSI report via PUCCH repetitions.

In some aspects, the UE includes means for determining that the resource and port occupation duration is to end in association with a last configured PUCCH repetition, from among the PUCCH repetitions, or a last actual PUCCH repetition, from among the PUCCH repetitions, when the transmission of the CSI report is determined to be based at least in part on transmitting the CSI report via PUCCH repetitions.

In some aspects, the UE includes means for determining that the resource and port occupation duration is to end in association with a first scheduled PUSCH repetition, from among the PUSCH repetitions, or a first actual PUSCH repetition, from among the PUSCH repetitions, when the transmission of the CSI report is determined to be based at least in part on transmitting the CSI report via PUSCH repetitions.

In some aspects, the UE includes means for determining that the resource and report occupation duration is to end in association with a last scheduled PUSCH repetition, from among the PUSCH repetitions, or a last actual PUSCH repetition, from among the PUSCH repetitions, when the transmission of the CSI report is determined to be based at least in part on transmitting the CSI report via PUSCH repetitions.

11 12

In some aspects, the UE includes means for determining that the CSI reference resource slot occurs a given number of slots before an occurrence of a first slot of a first PUCCH repetition when the transmission of the CSI report is determined to be based at least in part on transmitting the CSI report via PUCCH repetitions.

In some aspects, the UE includes means for determining that the CSI reference resource slot occurs a given number of slots before an occurrence of a first slot of a first PUSCH repetition when the transmission of the CSI report is determined to be based at least in part on transmitting the CSI report via PUSCH repetitions.

In some aspects, the UE includes means for determining that a first scheduled PUSCH repetition is canceled; and/or means for determining that the CSI reference resource slot occurs a given number of slots before an occurrence of a first actual PUSCH repetition or an occurrence of another scheduled PUSCH repetition.

In some aspects, the UE includes means for determining that a first configured PUCCH repetition is canceled; and/or means for determining that the CSI reference resource slot occurs a given number of slots before an occurrence of a first actual PUCCH repetition or an occurrence of another configured PUCCH repetition.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may conduct data communications with a BS in a wireless network such as an LTE network or a 5G/NR network. The data communications may include downlink communications from the BS to the UE and may include uplink communications from the UE to the BS. The data communications may take place over one or more channels between the UE and the BS.

Adequate reception of the downlink communications by the UE and adequate reception of the uplink communications by the BS may be crucial for the data communications. This is because the UE may utilize information included in the downlink communications to perform communication operations related to the data communications. For instance, the downlink communications may include downlink control information (DCI) such as, for example, a resource block assignment and/or modulation and coding scheme, which the UE may utilize to receive and decode downlink payload data. Similarly, the BS may utilize information included in the uplink communications to perform communication operations related to the data communications. For instance, the uplink communications may include uplink control information (UCI) such as, for example, channel status information (CSI), which the BS may utilize to determine transmission of downlink communications (e.g., analog beamforming, digital precoding, or the like) to the UE.

The CSI may indicate current channel conditions that may affect a measure of quality associated with the data communications over a channel. The BS may utilize the CSI to adapt transmission of downlink communications to current channel conditions and enable adequate reception of the downlink communications by the UE. To receive the CSI from the UE, the BS may dynamically transmit a physical downlink control channel (PDCCH) to request CSI reporting via PUSCH or may configure the UE to, for example, periodically or semi-persistently transmit the CSI via PUCCH. The UE may perform channel estimation to determine the CSI and transmit a CSI report including the CSI to the BS. The UE may transmit the CSI report via a physical uplink control channel (PUCCH) and/or a physical uplink shared channel (PUSCH).

Figure 3:
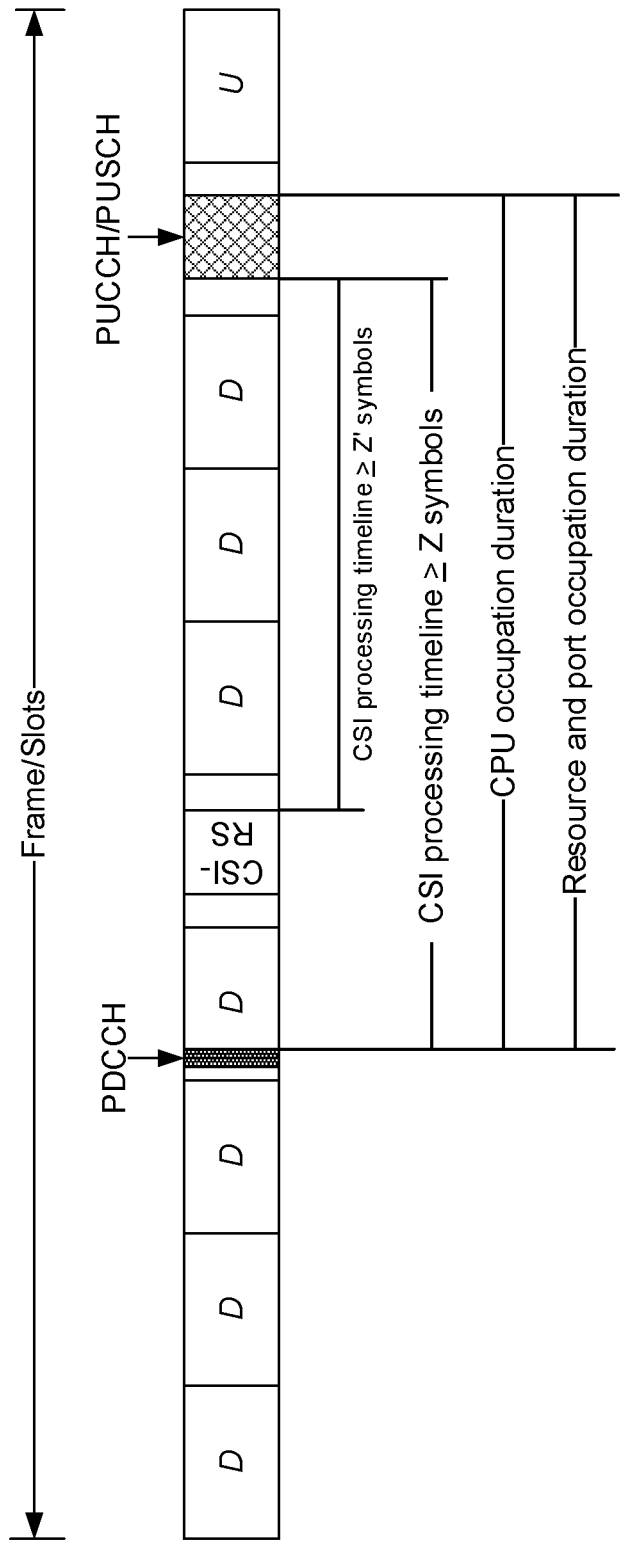
FIG. 3 is a diagram illustrating an example of determining criteria for reporting channel status information, in accordance with various aspects of the present disclosure.

Performance of the channel estimation by the UE may be related to a plurality of CSI criteria (also referred to as CSI parameters), which may be associated with reception of the PDCCH and/or transmission of the PUCCH/PUSCH. For instance, as shown in FIG. 3, the UE may receive a PDCCH during a downlink slot D and may transmit the PUCCH/ PUSCH during an uplink slot U. The CSI parameters may include a CSI processing timeline, a CSI processing unit (CPU) occupation duration, and/or a resource and port occupation duration having durations starting at a time associated with reception of the PDCCH. The CSI processing timeline may be associated with satisfying two conditions. For instance, as shown in FIG. 3, the CSI processing timeline may be associated with a time gap from an end of a last OFDM symbol of the PDCCH triggering the CSI report to a first OFDM symbol of a PUSCH carrying the CSI report, and should satisfy a first condition of being equal to or greater than a duration associated with Z symbols. The CSI processing timeline may also be associated with a time gap from an end of a last OFDM symbol of the CSI-RS to a first OFDM symbol of the PUSCH carrying the aperiodic CSI report, and should satisfy a second condition of being equal to or greater than a duration associated with Z' symbols. When the CSI processing timeline satisfies the first condition (e.g., the CSI processing time is satisfied) and/or the CSI-RS timeline satisfies the second condition (e.g., the CSI processing timeline is satisfied), the UE may adequately determine and update the CSI. If the CSI processing timeline fails to satisfy the first condition and/or the CSI processing timeline fails to satisfy the second condition, the UE may not be able to adequately determine and update the CSI and may drop the CSI reporting. The CPU occupation duration time may be associated with counting CPUs available to the UE to determine the CSI and transmit the CSI report. The CPU occupation duration for an aperiodic CSI report may start from a first symbol after the PDCCH triggering the CSI report and may end at a last symbol of the PUSCH carrying the CSI report. For an initial semi-persistent CSI report carried on a PUSCH after the UE receives a PDCCH trigger, the CPU duration may start from a first symbol after the PDCCH and may end at a last symbol of the PUSCH carrying the CSI report. For a periodic or semi-persistent CSI report, the CPU duration may start at a first symbol of the earliest one of each CSI-RS/CSI-IM/SSB resource for channel or interference measurement, respective latest CSI-RS/CSI-IM/SSB occasion no later than the corresponding CSI reference resource, and may end at a last symbol of a configured PUCCH or a scheduled PUSCH carrying the CSI report. The resource and port occupation duration may be associated with counting resources and ports available to the UE to determine the CSI and transmit the CSI report. For an aperiodic CSI-RS, the resource and port occupation duration may start from an end of the PDCCH containing the request and may end at an end of the PUSCH containing the CSI report associated with the aperiodic CSI-RS. Based on specified durations of the CSI parameters, known to the BS and the UE, the UE may perform the channel estimation and CSI measurements.

In some cases, PDCCH repetition and PUCCH and/or PUSCH (referred to as PUCCH/PUSCH) repetition may be supported. PDCCH repetition may be associated with the BS transmitting a plurality of instances of the PDCCH. For instance, the BS may transmit a first instance of the PDCCH (e.g., PDCCH repetition 1) and transmit a second instance of the PDCCH (e.g., PDCCH repetition 2). In an example, the PDCCH repetition 1 and the PDCCH repetition 2 may include substantially the same information. PUCCH/PUSCH repetition may be associated with the UE transmitting a plurality of instances of the PUCCH/PUSCH. For instance, the UE may transmit a first instance of the PUCCH/PUSCH (e.g., PUCCH/PUSCH repetition 1) and transmit a second instance of the PUCCH/PUSCH (e.g., PUCCH/PUSCH repetition 2). In an example, the PUCCH/PUSCH repetition 1 and the PUCCH/PUSCH repetition 2 may include substantially the same information. In some aspects, different PDCCH repetitions can be transmitted from a same transmission-reception point (TRP) associated with a same transmission configuration indicator (TCI) state or from different TRPs associated with different TCI states. In some aspects, different PDCCH repetitions may lie in different CORESETs. Further, a CORESET associated with each PDCCH repetition may lie in a different CORESET pool. In some aspects, the different PDCCH repetitions may lie (e.g., may be received) in different time slots.

Because of the plurality of instances of the PDCCH, start times and end times associated with the UE determining the CSI and transmitting the CSI report should be specified. Otherwise, there may be a misalignment between the BS and the UE. In an example, with respect to the CPU occupation duration, the BS may start to count CPUs with respect to PDCCH repetition 2 while the UE may start to count CPUs with respect to PDCCH repetition 1. In an example, the BS may schedule transmission of a first CSI report (e.g., CSI 1) while the UE may be performing channel estimation for a previously scheduled CSI report (e.g., CSI 0). Transmission of CSI 1 may support PDCCH repetition, with PDCCH repetition 1 being received during a second symbol in a slot n and PDCCH repetition 2 being received during a second symbol in a slot n+1. CPU occupation for transmission of CSI 0 may end during a twelfth symbol in the slot n. IN this case, when receiving PDCCH repetition 1 during the second symbol in the slot n, the UE may determine whether there is available CPU for transmission of CSI 1. Because channel estimation performance is still ongoing for transmission of CSI 0, the UE may determine that CPU occupation may not end until the twelfth symbol in the slot n. Consequently, the UE may determine that there is no CPU available for performing channel estimation associated with transmission of CSI 1. As a result, the UE may determine that the UE is not to perform channel estimation for transmission of CSI 1 and may transmit a junk CSI report for CSI 1. However, based on scheduling transmission for CSI 1, the BS may start counting CPUs from receipt of PDCCH repetition 2, received during the second symbol of the slot n+1, and may expect to receive a valid transmission for CSI 1. In this case, due to the misalignment, a scheduling by the BS for the UE to transmit the CSI report may exceed a CPU capability of the UE. As a result, the UE may be unable to adequately determine the CSI associated with the channel and to transmit the CSI report to the BS.

Similarly, with respect to the CSI processing timeline, it should be specified whether the UE is to transmit the CSI report based on a first time gap associated with PDCCH repetition 1 or based on a second time gap associated with PDCCH repetition 2. Otherwise, there may be a misalignment between the BS and the UE. In a situation where the first time gap satisfies the CSI processing timeline and the second time gap does not satisfy the CSI processing timeline, the BS may expect the UE to transmit the CSI report based on the first time gap. However, the UE may determine that the UE is to transmit the CSI report based on the second time gap, and may be unable to adequately determine the CSI because the second time gap fails to satisfy the CSI processing timeline. As a result, due to the misalignment, the UE may be unable to adequately determine the CSI associated with the channel and to transmit the CSI report to the BS.

Similarly, because of the plurality of instances of the PUCCH/PUSCH, it should be specified whether the UE is to end a CPU counting and/or resource and port counting (e.g., end occupation of processing resources and/or resources and ports) at a time associated with transmission of the PUCCH/PUSCH repetition 1 or at a time associated with transmission of the PUCCH/PUSCH repetition 2. Otherwise, there may be a misalignment between the BS and the UE. In some aspects, the UE may determine an error case, and fail to transmit the CSI report, when there is a misalignment between the BS and the UE regarding a time when the UE is to end the CPU counting and/or resource and port counting.

Without adequately receiving the CSI report, including the CSI, the BS may fail to adequately adapt transmission of downlink communications to current channel conditions. As a result, the UE may fail to adequately receive downlink communications and to perform the communication operations related to the data communications. Consequently, the data communications between the BS and the UE may experience an interruption or a stoppage.

Various aspects of techniques and apparatuses described herein may enable determining CSI criteria for reporting CSI. In some aspects, the CSI criteria may be associated with PDCCH repetition and/or PUCCH/PUSCH repetition. By utilizing the determined CSI criteria, as discussed herein, a UE may be enabled to adequately determine when to start CPU counting and/or resource and port counting associated with performing the channel estimation and when to end CPU counting and/or resource and port counting associated with performing the channel estimation. As a result, the UE may adequately determine the CSI associated with a channel, utilized for data communications between the UE and a BS, and transmit a CSI report including the CSI to the BS. Based at least in part on receiving the CSI, the BS may adequately adapt transmission of downlink communications to current channel conditions and enable the UE to adequately receive the downlink communications. In this way, the UE may be enabled to adequately perform communication operations related to the data communications, and the data communications between the BS and the UE may continue uninterrupted.

In some aspects, the UE may determine a transmission of a CSI report based at least in part on receiving a CSI request via PDCCH repetitions, or based at least in part on transmitting the CSI report via PUCCH repetitions, or based at least in part on transmitting the CSI report via PUSCH repetitions; determine, based at least in part on the determined transmission of the CSI report, CSI processing criteria including one or more of a CSI processing timeline, a CPU occupation duration, a resource and port occupation duration, or a CSI reference resource slot; and selectively transmit the CSI report based at least in part on the determined CSI processing criteria.

Figure 4:
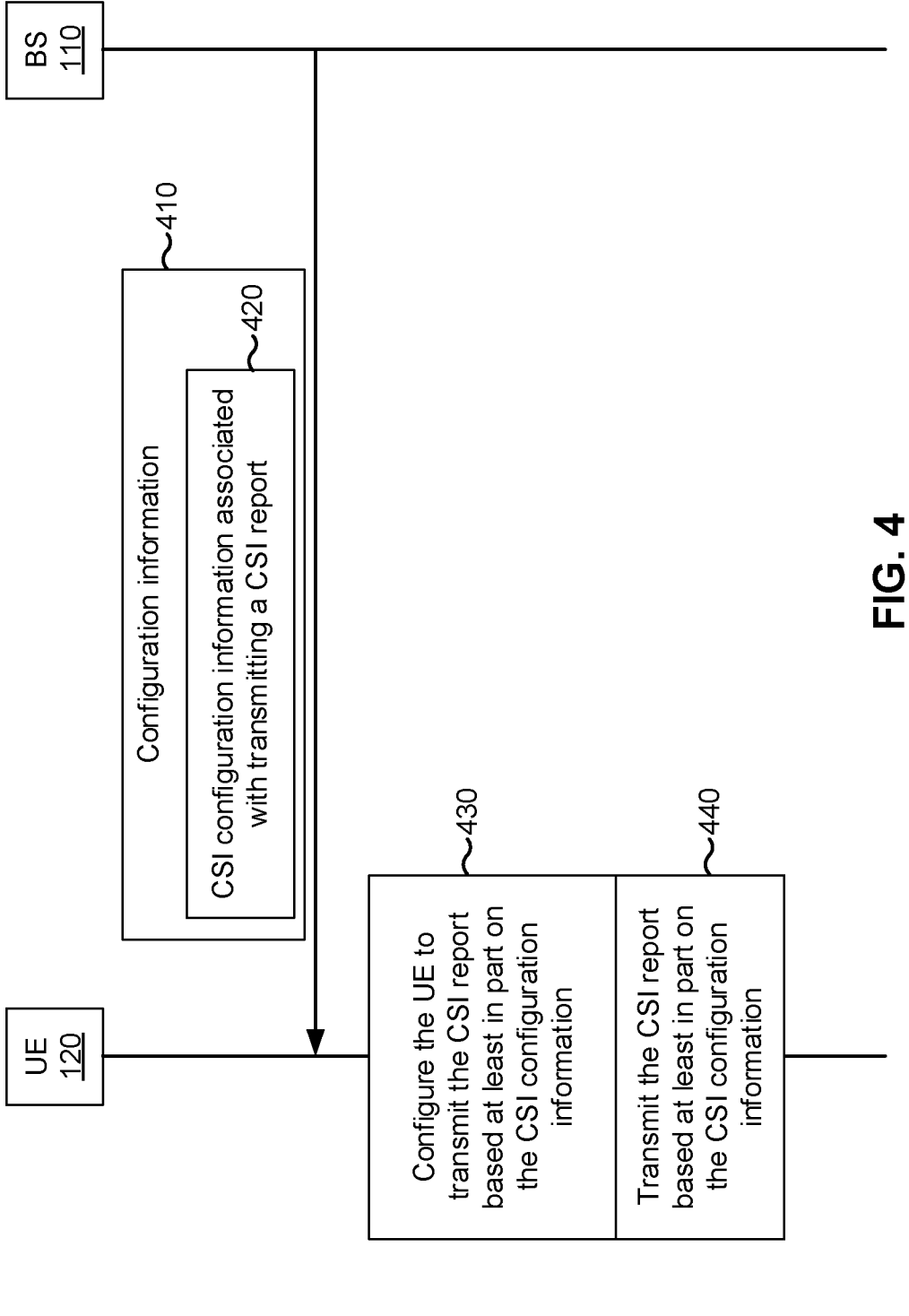
FIG. 4 is a diagram illustrating an example of determining criteria for reporting channel status information, in accordance with various aspects of the present disclosure.

FIG. 4 is a diagram illustrating an example 400 associated with determining criteria for reporting CSI, in accordance with various aspects of the present disclosure. FIG. 4 shows a UE 120 and a BS 110 conducting data communications in, for example, an LTE network or a 5G/NR network. The data communications may take place over a channel and may include downlink communications from the BS 110 to the UE 120 and may include uplink communications from the UE 120 to the BS 110.

As shown by reference number 410, the BS 110 may transmit, and the UE 120 may receive, configuration information prior to initiation of, at a beginning of, and/or during the data communications. In some aspects, the configuration information may include an indication of, for example, one or more configuration parameters for the UE 120 to use to configure the UE 120 for the data communications. In some aspects, the UE 120 may receive the configuration information via system information broadcasted by the BS 110. In some aspects, the UE 120 may receive the configuration information from a device other than BS 110 (e.g., from another base station). In some aspects, the UE 120 may receive the configuration information via, for example, a control channel (e.g., PDCCH) between the UE 120 and the BS 110. The configuration information may be communicated via radio resource control (RRC) signaling, MAC signaling (e.g., MAC control element (MAC CE)), downlink control information (DCI) signaling, or a combination thereof (e.g., RRC configuration of a set of values for a parameter and DCI indication of a selected value of the parameter).

As shown by reference number 420, the configuration information may include CSI configuration information associated with the UE 120 transmitting a CSI report to the BS 110. In some aspects, the CSI report may include CSI associated with the channel. The CSI may enable the BS 110 to adapt transmission of downlink communications to current channel conditions, thereby enabling the UE 120 to adequately receive the downlink communications. As shown by reference number 430, based at least in part on the CSI configuration information, the UE 120 may configure the UE 120 to transmit the CSI report, including the CSI for the channel. As shown by reference number 440, the UE 120 may transmit the CSI report based at least in part on the configuration information.

In some aspects, the CSI configuration information may include a type of CSI report to be transmitted by the UE 120. Examples of types of CSI reports include a periodic CSI report including periodic CSI, a semi-persistent CSI report including semi-persistent CSI, and/or an aperiodic CSI report including aperiodic CSI.

For the periodic CSI report, the CSI configuration information may indicate a configured slot offset and/or a periodicity associated with the UE 120 transmitting the periodic CSI report. In some aspects, the UE 120 may start to the transmit CSI periodically with the configured slot offset and/or periodicity based at least in part on receiving the CSI configuration information. The UE 120 may transmit the periodic CSI report via PUCCH. For the semi-persistent CSI report, the CSI configuration information may indicate a slot offset and/or a periodicity associated with the UE 120 transmitting the semi-persistent CSI report. The UE 120 may transmit the semi-persistent CSI report via the PUCCH or via the PUSCH. In some aspects, the BS 110 may transmit a MAC CE activation command during the data communications to the UE 120 indicating that the UE 120 is to transmit the semi-persistent CSI report via the PUCCH. The CSI configuration information may indicate that, based at least in part on receiving the MAC CE activation command, the UE 120 is to transmit the semi-persistent CSI report via the PUCCH in accordance with the associated slot offset and/or the periodicity. In some aspects, the BS 110 may transmit a DCI, comprising a request for the semi-persistent CSI report, during the data communications. The DCI may indicate that the UE 120 is to transmit the semi-persistent CSI report via the PUSCH. In some aspects, the CSI configuration information may indicate that, based at least in part on receiving the DCI, the UE 120 is to transmit the semi-persistent CSI report via the PUSCH in accordance with the slot offset and/or the periodicity associated with transmitting the semi-persistent CSI report. For the aperiodic CSI report, the CSI configuration information may indicate that the UE 120 is to transmit the aperiodic CSI report based at least in part on dynamically receiving, during the data communications, a DCI comprising a CSI request for the aperiodic CSI. Based at least in part on receiving the DCI, the UE 120 may transmit the aperiodic CSI report to the BS 110.

In some cases, PDCCH repetition and PUCCH and/or PUSCH (referred to as PUCCH/PUSCH) repetition may be supported. Based at least in part on the type of CSI report to be transmitted, the BS 110 may configure the UE 120 to determine a transmission of the CSI report. In some aspects, the UE 120 may determine that the CSI report is to be transmitted based at least in part on receiving the CSI request via PDCCH repetitions. In some aspects, the UE 120 may determine that the CSI report is to be transmitted via PUCCH repetitions. In some aspects, the UE 120 may determine that the CSI report is to be transmitted via PUSCH repetitions. Based at least in part on determining the transmission of the CSI report, the UE 120 may determine CSI processing criteria (e.g., parameters). Based at least in part on determining the CSI criteria, as shown by reference number 440, the UE 120 may selectively transmit the CSI report to the BS 110.

The UE 120 may determine whether criteria associated with the CSI parameters a satisfied to perform the channel estimation and determine the CSI. The CSI parameters may include, for example, a CSI processing timeline, a CSI-reference signal (CSI-RS) processing timeline, a CPU occupation duration, a resource and port occupation duration, and/or a CSI reference resource slot location.

In some aspects, the CSI processing timeline may be associated with a duration of the UE 120 to decode the received PDCCH repetitions, to determine whether the PDCCH repetitions include a CSI request for the UE 120 to transmit the CSI report, to perform the channel estimation and perform measurements and/or calculations to determine the CSI, and/or to prepare an uplink transmission via the PUCCH/PUSCH to transmit the CSI report including the determined CSI. In some aspects, the CSI processing timeline may be associated with a duration related to a first quantity (e.g., Z) of symbols. Based at least in part on the duration of the CSI processing timeline being satisfied, the UE 120 may selectively transmit the CSI report. In an example, the BS 110 may transmit the PDCCH repetitions including the CSI request such that the time gap from an end of a last OFDM symbol of the PDCCH triggering the CSI report to a first OFDM symbol of a PUSCH carrying the CSI report is equal to or greater than the duration related to the first quantity (e.g., Z) of symbols to allow the UE 120 to adequately determine the CSI. In this case, the UE 120 may determine that the CSI processing timeline is satisfied, may adequately determine the CSI, and may select to transmit the CSI report to the BS 110. In a situation where the duration of the CSI processing timeline is not satisfied (e.g., the duration of the CSI timeline is shorter than the duration related to the first quantity (e.g., Z) of symbols), the UE 120 may select to ignore the PDCCH repetitions including the CSI request and/or to not transmit the CSI report.

In some aspects, the CSI processing timeline may also be associated with a duration of the UE 120 to perform CSI-RS channel estimation, to perform measurements and/or calculations to determine the CSI, and/or to prepare the uplink transmission to transmit the CSI report including the determined CSI. In some aspects, the CSI processing timeline may be associated with a duration related to a second quantity (e.g., Z') of symbols. Based at least in part on the CSI processing timeline being satisfied, the UE 120 may selectively transmit the CSI report. In an example, the BS 110 may transmit the CSI-RS such that the time gap from an end of a last OFDM symbol of the CSI-RS to a first OFDM symbol of the PUSCH carrying the CSI report is equal to or greater than the duration related to the second quantity (e.g., Z') of symbols to allow the UE 120 to adequately determine the CSI. In this case, the UE 120 may determine that the CSI processing timeline is satisfied, may determine the CSI, and may select to transmit the CSI report to the BS 110. In a situation where the duration of the CSI processing timeline is not satisfied (e.g., the CSI processing timeline is shorter than the duration related to the second quantity (e.g., Z) of symbols), the UE 120 may select to ignore the CSI-RS and/or to not transmit the CSI report. In some aspects, the UE 120 may determine the first quantity (e.g., Z) of symbols and/or the second quantity (e.g., Z) of symbols based at least in part on these quantities being specified in a specification.

As discussed above, the BS 110 may transmit the PDCCH and/or the CSI-RS to allow the UE 120 to adequately perform the channel estimation and to determine the CSI. In other words, the BS 110 may transmit the PDCCH and/or the CSI-RS based at least in part on capabilities of the UE 120. For instance, based at least in part on a capability of the UE 120 to complete performance of the channel estimation to determine the CSI within a particular duration of time, the BS 110 may transmit the PDCCH and/or the CSI-RS to accommodate the particular duration of time to enable the UE 120 to complete performance of the channel estimation and to determine the CSI. In some aspects, the BS 110 may receive the capabilities of the UE 120 prior to transmitting the PDCCH and/or the CSI-RS.

In some aspects, based at least in part on PDCCH repetition being supported, the UE 120 may determine that the CSI processing timeline is associated with reception of a particular PDCCH repetition.

Figure 5A:
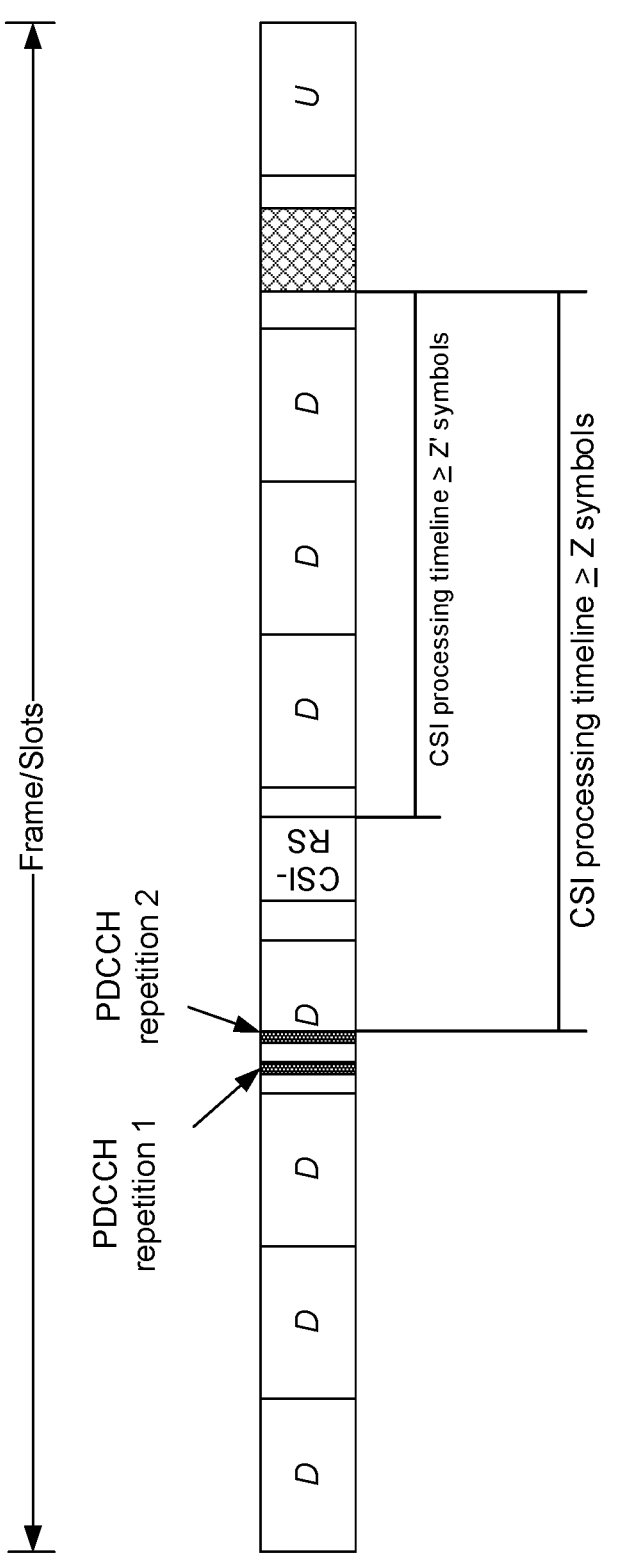
FIGS. 5A-5C are diagrams illustrating examples of determining criteria for reporting channel status information, in accordance with various aspects of the present disclosure.

For instance, the UE 120 may determine that the duration of the CSI processing timeline is to start in association with reception of a last received PDCCH repetition, from among the received PDCCH repetitions. For instance, in a case where two PDCCH repetitions are received during a downlink slot D, as shown in FIG. 5A, such that PDCCH repetition 1 is received prior to PDCCH repetition 2, the UE 120 may determine that the time gap from an end of a last OFDM symbol of the PDCCH triggering the CSI report to a first OFDM symbol of a PUSCH carrying the CSI report is to start in association with (e.g., from an end of) reception of the PDCCH repetition 2, which is the last received PDCCH repetition. In some aspects, the two PDCCH repetitions may be received during different downlink slots D. Further, the UE 120 may determine that the duration of the time gap from an end of a last OFDM symbol of the PDCCH triggering the CSI report to a first OFDM symbol of a PUSCH carrying the CSI report is to end in association with an uplink channel carrying the CSI report during an uplink slot U. In some aspects, the uplink channel carrying the CSI report may be a scheduled PUSCH or a first scheduled PUSCH repetition. In some aspects, the uplink channel carrying the CSI report may be a configured PUCCH or a first configured PUCCH repetition. In this case, the BS 110 transmits, and the UE 120 receives, both PDCCH repetition 1 and PDCCH repetition 2 such that the duration of the CSI processing timeline is equal to or greater than the duration related to the first quantity (e.g., Z) of symbols to accommodate capabilities of the UE 120 to determine the CSI. In some aspects, the UE 120 expects that the gap between the end of the last symbol of the last PDCCH repetition and the first symbol of PUSCH or the first symbol of the first PUSCH repetition is equal to or greater than the duration related to the first quantity (e.g., Z) of symbols.

Figure 5B:
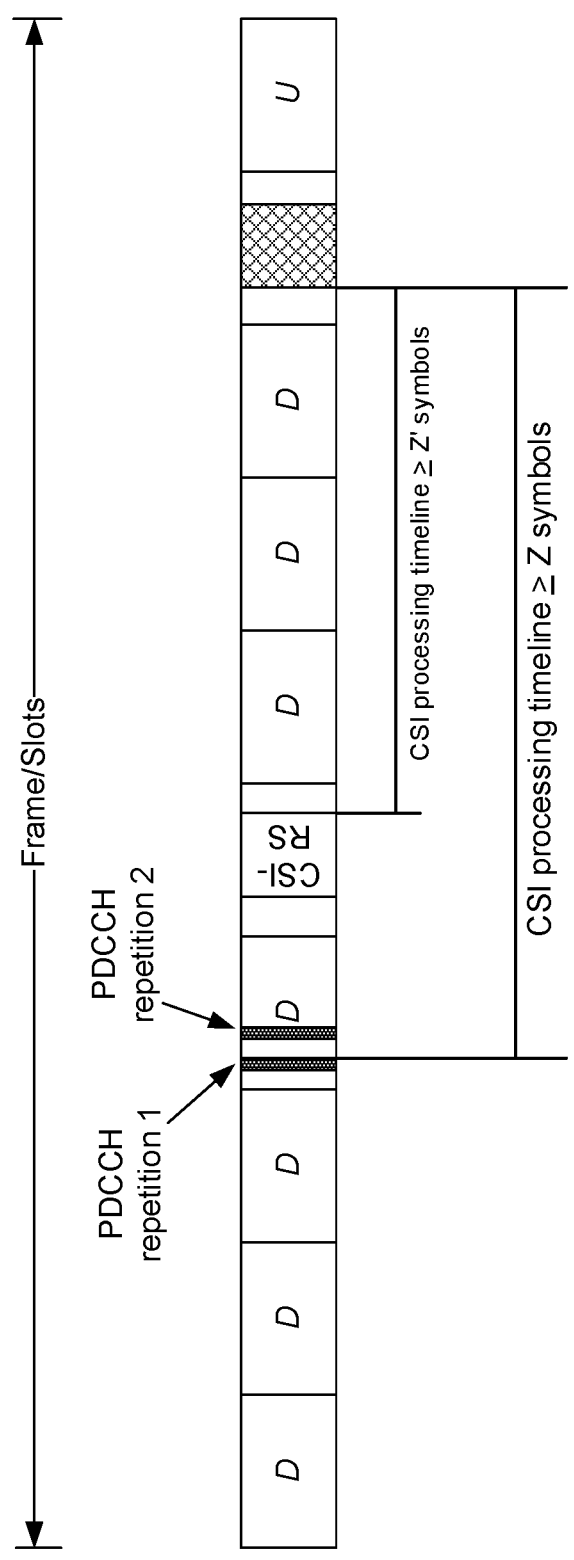

In some aspects, the UE 120 may determine that the duration of the CSI processing timeline is to start in association with the reception of a first received PDCCH repetition, from among the received PDCCH repetitions. For instance, in a case where two PDCCH repetitions are received, as shown in FIG. 5B, such that PDCCH repetition 1 is received prior to PDCCH repetition 2, the UE 120 may determine that the time gap from an end of a last OFDM symbol of the PDCCH triggering the CSI report to a first OFDM symbol of a PUSCH carrying the CSI report is to start in association with (e.g., from an end of) reception of the PDCCH repetition 1, which is the first received PDCCH repetition. Further, the UE 120 may determine that the duration of the time gap from an end of a last OFDM symbol of the PDCCH triggering the CSI report to a first OFDM symbol of a PUSCH carrying the CSI report is to end in association with an uplink channel carrying the CSI report during an uplink slot U. In some aspects, the uplink channel carrying the CSI report may be a scheduled PUSCH or a first scheduled PUSCH repetition. In some aspects, the uplink channel carrying the CSI report may be a configured PUCCH or a first configured PUCCH repetition. In this case, PDCCH repetition 2 may be received within the duration of the CSI processing timeline and may possibly fail to accommodate capabilities of the UE 120 to determine the CSI. In some aspects, the UE 120 expects that the gap between the end of the last symbol of the first PDCCH repetition and the first symbol of PUSCH or the first symbol of the first PUSCH repetition is equal to or greater than the duration related to the first quantity (e.g., Z) of symbols.

Figure 5C:
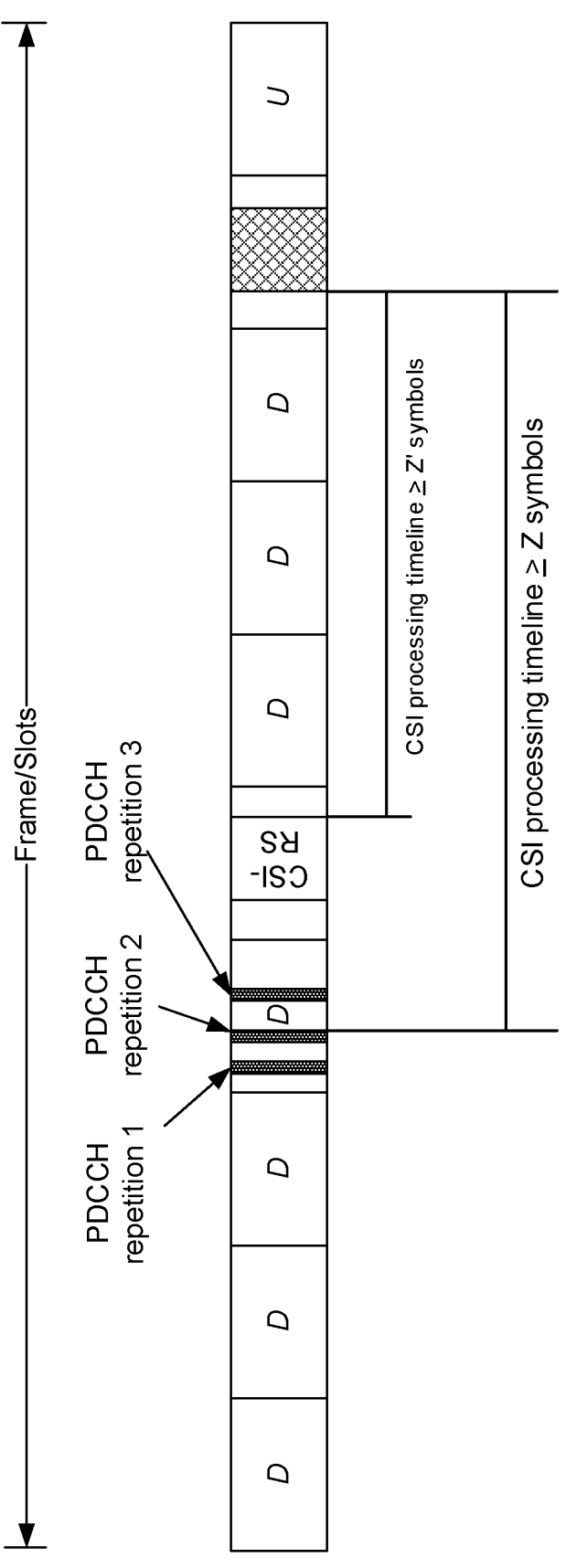

In some aspects, the UE 120 may determine that the duration of the CSI processing timeline is to start in association with the reception of a particular received PDCCH repetition, from among the received PDCCH repetitions. For instance, in a case where three PDCCH repetitions are received, as shown in FIG. 5C, such that PDCCH repetition 1 is received first, PDCCH repetition 2 is received second, and PDCCH repetition 3 is received last, the UE 120 may determine that the time gap from an end of a last OFDM symbol of the PDCCH triggering the CSI report to a first OFDM symbol of a PUSCH carrying the CSI report is to start in association with (e.g., from an end of) reception of the PDCCH repetition 2. Further, the UE 120 may determine that the duration of the time gap from an end of a last OFDM symbol of the PDCCH triggering the CSI report to a first OFDM symbol of a PUSCH carrying the CSI report is to end in association with an uplink channel carrying the CSI report during an uplink slot U. In some aspects, the uplink channel carrying the CSI report may be a scheduled PUSCH or a first scheduled PUSCH repetition. In some aspects, the uplink channel carrying the CSI report may be a configured PUCCH or a first configured PUCCH repetition. In this case, both PDCCH repetition 1 and PDCCH repetition 2 are received such that the duration of the CSI processing timeline is equal to or greater than the duration related to the first quantity (e.g., Z) of symbols to accommodate capabilities of the UE 120 to determine the CSI. PDCCH repetition 3 may be received within the duration of the CSI processing timeline and may possibly fail to accommodate capabilities of the UE 120 to determine the CSI. In some aspects, the UE 120 expects that the gap between the end of the last symbol of at least one PDCCH repetition and the first symbol of PUSCH or the first symbol of the first PUSCH repetition is equal to or greater than the duration related to the first quantity (e.g., Z) of symbols.

In some aspects, as shown in FIGS. 5A-C, the UE 120 may determine that the CSI processing timeline is associated with reception of a CSI-RS. For instance, the UE 120 may determine that the time gap from an end of a last OFDM symbol of the CSI-RS to a first OFDM symbol of the PUSCH carrying the CSI report is to start in association with reception of the CSI-RS and that the duration of the time gap from an end of a last OFDM symbol of the CSI-RS to a first OFDM symbol of the PUSCH carrying the CSI report is to end in association with transmission of the uplink channel carrying the CSI report. In some aspects, the CSI processing timeline may be equal to or greater than the duration related to the second quantity (e.g., Z') of symbols to accommodate capabilities of the UE 120 to determine the CSI. In other words, the BS 110 may transmit, and the UE 120 may receive, the CSI-RS such that the CSI processing timeline may be equal to or greater than the duration related to the second quantity (e.g., Z) of symbols to accommodate capabilities of the UE 120 to determine the CSI.

In some aspects, a CPU occupation duration (for counting CPU resources) may be associated with a duration for which the UE 120 may process a particular quantity of concurrent calculations (e.g., CSI calculations) to determine the CSI. In other words, the UE 120 may have a limited capability of performing the particular quantity of CSI calculations. In some aspects, the CPU occupation duration may be associated with reception of the PDCCH repetitions and/or the uplink channel carrying the CSI report.

Figure 6A:
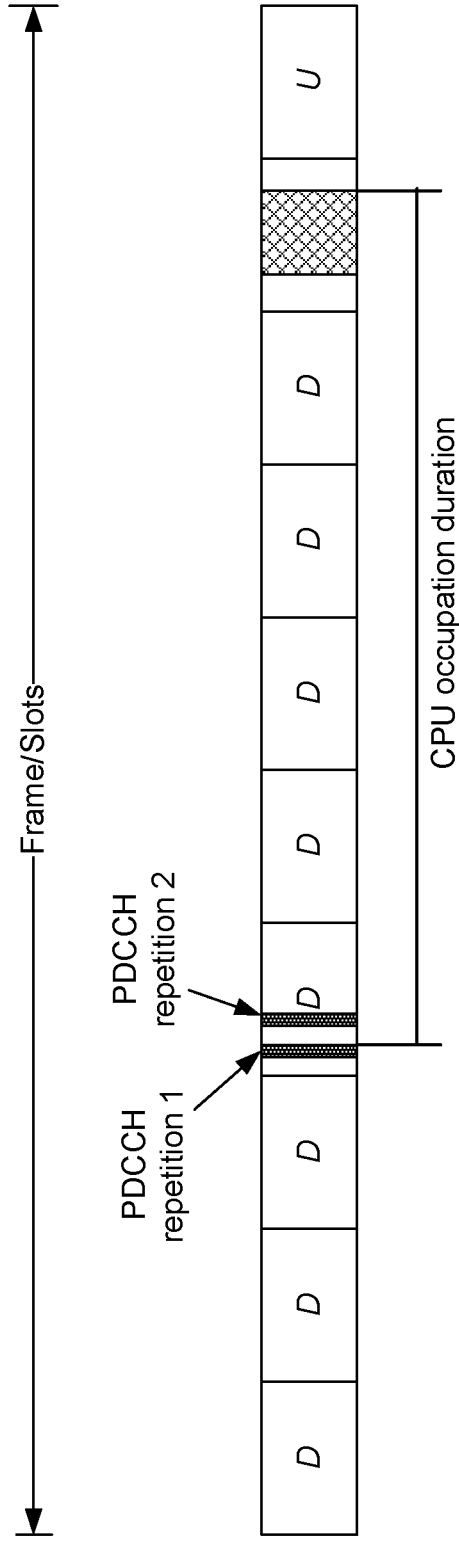
FIGS. 6A-6C are diagrams illustrating examples of determining criteria for reporting channel status information, in accordance with various aspects of the present disclosure.

In some aspects, the UE 120 may determine that the CPU occupation duration is associated with reception of a particular PDCCH repetition. For instance, the UE 120 may determine that the counting of CPU resources is to start in association with reception of a first received PDCCH repetition, from among the received PDCCH repetitions. For instance, in a case where two PDCCH repetitions are received, as shown in FIG. 6A, such that PDCCH repetition 1 is received prior to PDCCH repetition 2, the UE 120 may determine that the CPU occupation duration is to start in association with (e.g., from an end of) reception of the PDCCH repetition 1, which is the first received PDCCH repetition. The UE 120 may determine the CSI during the CPU occupation duration, and may transmit the CSI report to the BS 110. Further, as discussed below in more detail, the UE 120 may determine that the counting of CPU resources is to end in association with the uplink channel carrying the CSI report. In some aspects, for the aperiodic CSI report and/or the initial semi-persistent CSI report, the CPU occupies from the first symbol after the first PDCCH repetition triggering the CSI report.

Figure 6B:
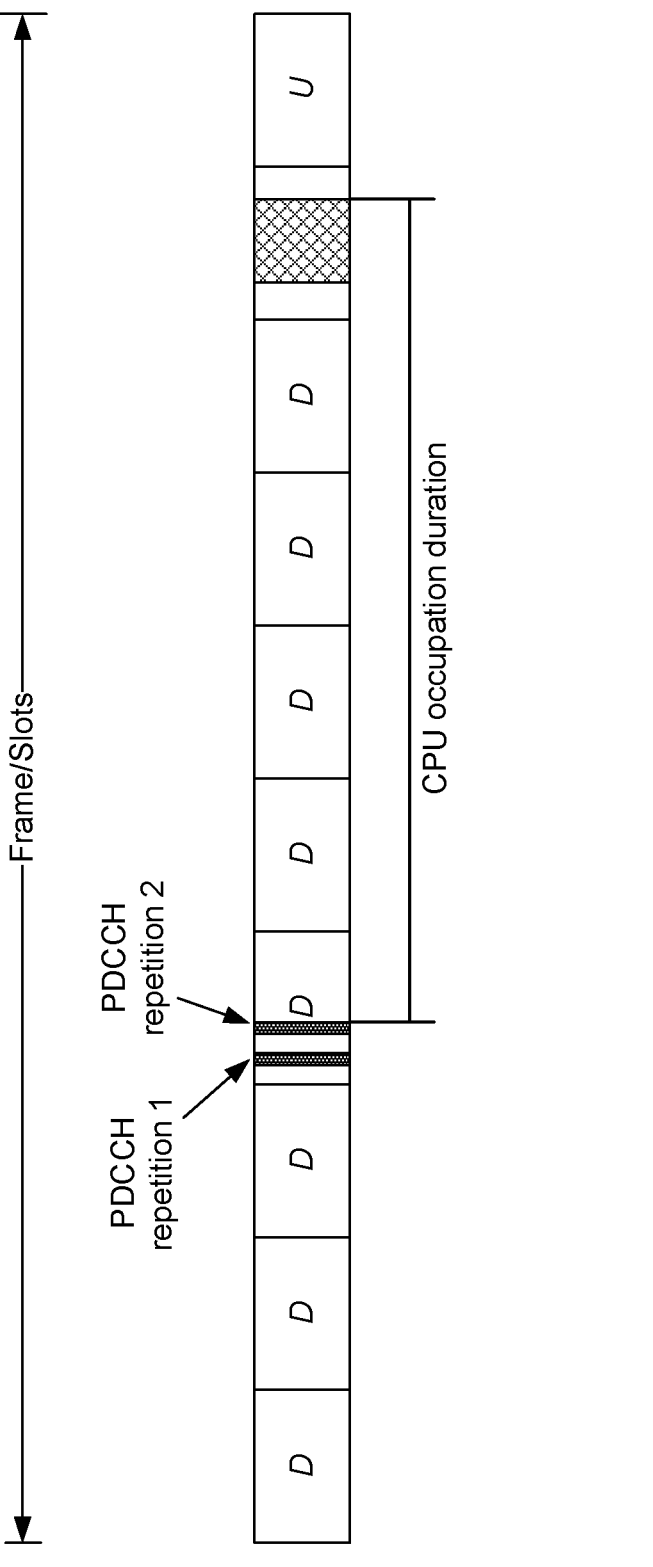

In some aspects, the UE 120 may determine that the counting of CPU resources is to start in association with reception of a last received PDCCH repetition, from among the received PDCCH repetitions. For instance, in a case where two PDCCH repetitions are received, as shown in FIG. 6B, such that PDCCH repetition 1 is received prior to PDCCH repetition 2, the UE 120 may determine that the counting of the CPU resources is to start in association with (e.g., from an end of) reception of the PDCCH repetition 2, which is the last received PDCCH repetition. The UE 120 may determine the CSI during the CPU occupation duration, and the UE 120 may transmit the CSI report to the BS 110. In this case, the PDCCH repetition 2 is received within the CPU occupation duration while PDCCH repetition 1 is received prior to a start of the CPU occupation duration. In some aspects, for the aperiodic CSI report and/or the initial semi-persistent CSI report, the CPU occupies from the first symbol after the last PDCCH repetition triggering the CSI report.

Figure 6C:
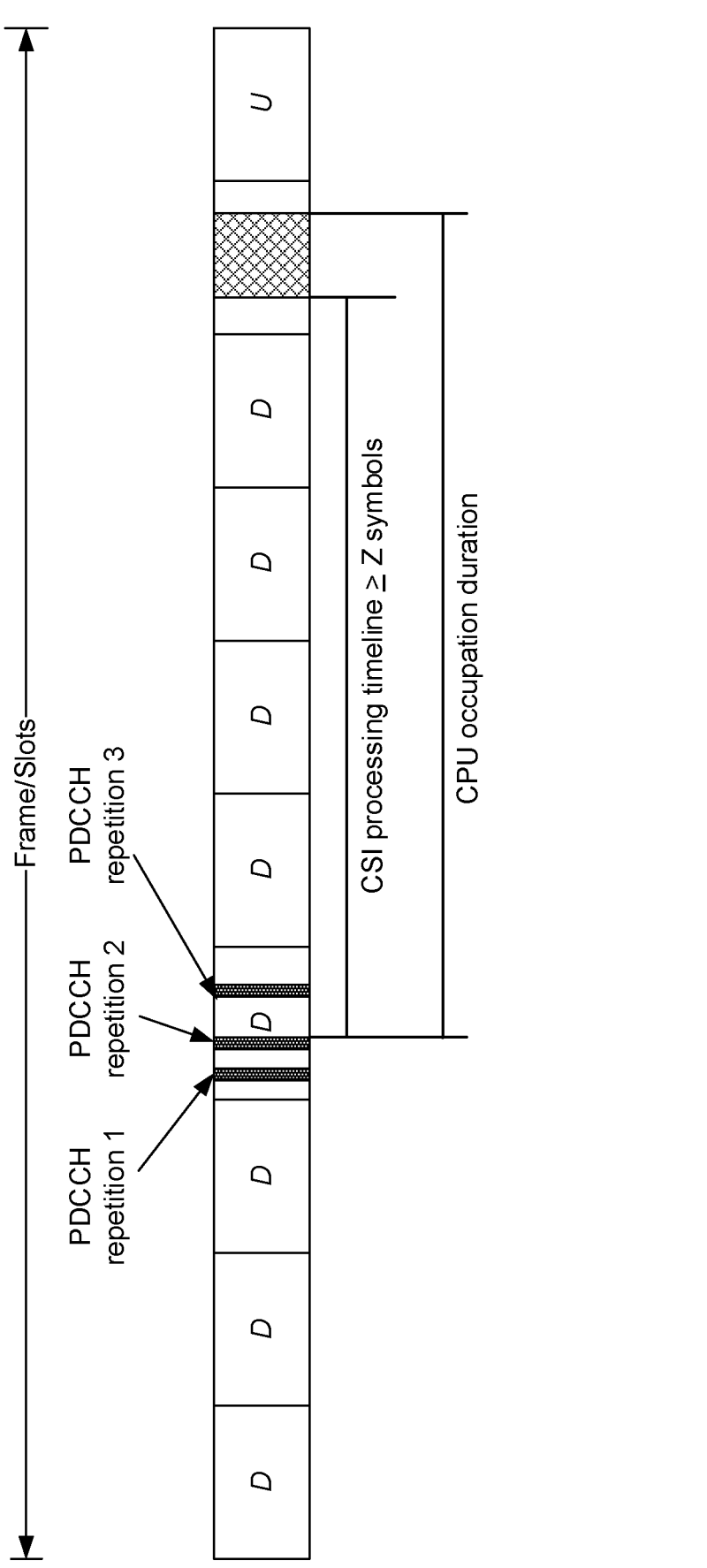

In some aspects, the UE 120 may determine that the counting of the CPU resources is to start in association with the reception of a particular received PDCCH repetition, from among a plurality of received PDCCH repetitions. For instance, in a case where three PDCCH repetitions are received, as shown in FIG. 6C, such that PDCCH repetition 1 is received first, PDCCH repetition 2 is received second, and PDCCH repetition 3 is received last, the UE 120 may determine that the counting of the CPU resources is to start in association with (e.g., from an end of) reception of the PDCCH repetition 2. In some aspects, the PDCCH repetition 2 may be the last received PDCCH repetition that satisfies the CSI processing timeline. In other words, the PDCCH repetition 2 may be the last received PDCCH repetition such that the duration of the time gap from an end of a last OFDM symbol of the PDCCH triggering the CSI report to a first OFDM symbol of a PUSCH carrying the CSI report (also referred to as "the Z timeline") is equal to or greater than the duration related to the first quantity (e.g., Z) of symbols. In some aspects, for the aperiodic CSI report and/or the initial semi-persistent CSI report, the CPU occupies from the first symbol after the last PDCCH repetition, that satisfies the Z timeline, triggering the CSI report. In the example shown in FIG. 6C, the PDCCH repetition 1 and the PDCCH repetition 2 satisfy the CSI processing timeline, while the PDCCH repetition 3 fails to satisfy the CSI processing timeline. In this case, the CSI processing timeline and the CPU occupation duration may start at substantially the same time.

In some aspects, PUCCH/PUSCH repetition may be supported. In this case, the UE 120 may determine that an end of the CPU occupation time is associated with the uplink channel carrying the CSI report. With respect to FIGS. 6A-C, in some aspects, when the CSI report is an aperiodic CSI report or an initial semi-persistent CSI report, the uplink channel may be the PUSCH. In some aspects, the UE 120 may determine that the counting of CPU resources is to end (e.g., that the UE 120 is to release the resources) at a last symbol of a scheduled PUSCH, at a last symbol of an actual PUSCH, at a last symbol of the last scheduled PUSCH repetition, from among the PUSCH repetitions, or a last symbol of the last actual PUSCH repetition. In some aspects, when the CSI report is the aperiodic CSI report, the periodic CSI report, or the semi-persistent CSI report, the UE 120 may determine that the counting of CPU resources is to end (e.g., that the UE 120 is to release the resources) at a last symbol of a configured PUCCH, at a last symbol of an actual PUCCH, at a last symbol of the last configured PUCCH repetition, from among the PUSCH repetitions, or a last symbol of the last actual PUCCH repetition. In some aspects, the UE 120 may configure the UE 120 to release the particular quantity of resources at the end of the CPU occupation duration. In some aspects, for A-CSI reporting and initial SP-CSI on PUSCH, CPU releases (or CPU occupation ends) at the last symbol of the scheduled or actual PUSCH repetition or last symbol of last scheduled/actual PUSCH repetition carrying the report. For A/P/SP CSI reporting on PUCCH, CPU releases (or CPU occupation ends) at the last symbol of the configured or actual PUCCH or last symbol of last configured/actual PUCCH repetition carrying the report.

A scheduled PUSCH transmission may be associated with a PUSCH transmission when the UE 120 is scheduled to transmit the PUSCH carrying the CSI report. An actual PUSCH transmission may be associated with a PUSCH transmission when the UE 120 actually transmits the PUSCH carrying the CSI report. In some aspects, the UE 120 may be scheduled to transmit four PUSCH repetitions, but due to uplink (UL) collision, a first scheduled PUSCH repetition may be cancelled, and the UE 120 may actually transmit three PUSCH repetitions. In this case, the second scheduled PUSCH repetition, the third scheduled PUSCH repetition, and the fourth scheduled PUSCH repetition become the first actual PUSCH repetition, the second actual PUSCH repetition, and the third actual PUSCH repetition, respectively. A configured PUCCH transmission may be associated with a PUCCH transmission when the UE 120 is configured to transmit the PUCCH carrying the CSI report. An actual PUCCH transmission may be associated with a PUCCH transmission when the UE 120 actually transmits the PUCCH carrying the CSI report. In some aspects, the UE 120 may be configured to transmit four PUCCH repetitions, but due to UL collision, a first configured PUCCH repetition may be cancelled, and the UE 120 may actually transmit three PUCCH repetitions. In this case, the second configured PUCCH repetition, the third configured PUCCH repetition, and the fourth configured PUCCH repetition become the first actual PUCCH repetition, the second actual PUCCH repetition, and the third actual PUCCH repetition, respectively.

In some aspects, a resource and port occupation duration (for counting resources and ports) may be associated with a duration of the UE 120 to make available adequate resources and ports for determining the CSI. Further, the duration of the UE 120 to make available the adequate resources and ports may be based at least in part on a quantity of CSI-RS resources, a quantity of CSI-RS ports, and/or a quantity of CSI-RS ports per CSI-RS resource available to the UE 120. In some aspects, the resource and port occupation duration may be associated with reception of the PDCCH repetitions and/or the uplink channel carrying the CSI report.

Figure 7A:
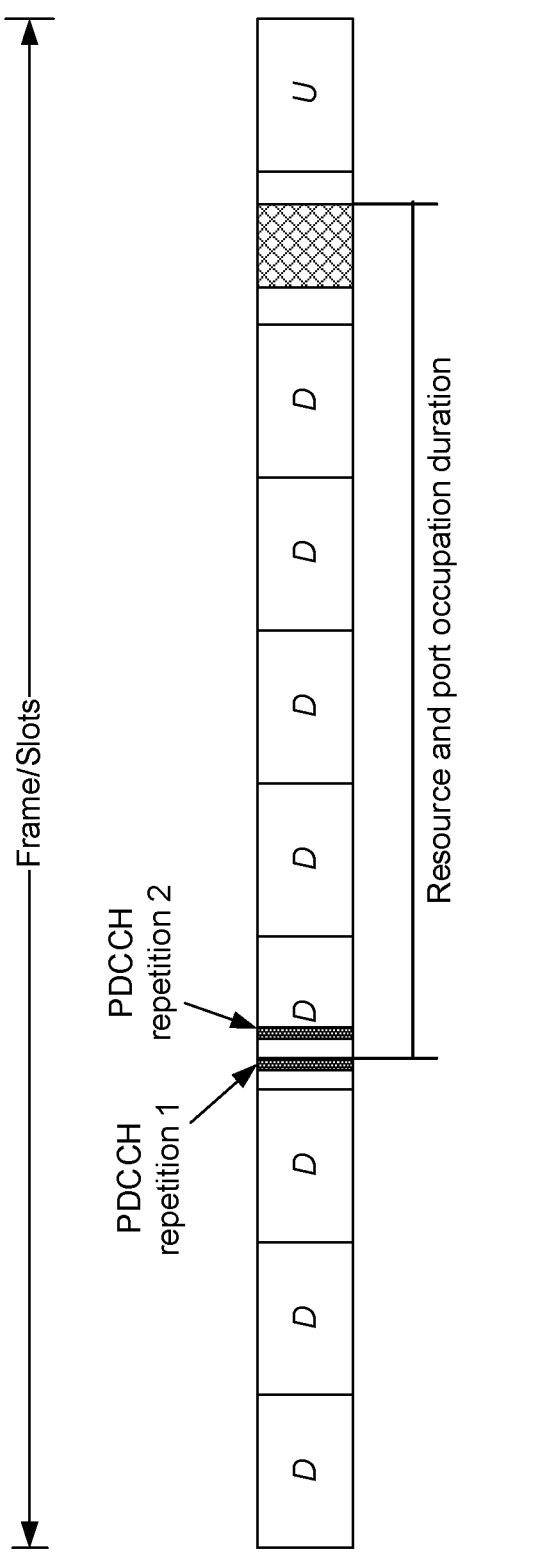
FIGS. 7A-7C are diagrams illustrating examples of determining criteria for reporting channel status information, in accordance with various aspects of the present disclosure.

In some aspects, for an aperiodic CSI-RS, the UE 120 may determine that the resource and port occupation timeline is associated with reception of a particular PDCCH repetition. For instance, the UE 120 may determine that the counting of resources and ports is to start in association with reception of a first received PDCCH repetition, from among a plurality of received PDCCH repetitions. For instance, in a case where two PDCCH repetitions are received, as shown in FIG. 7A, such that PDCCH repetition 1 is received prior to PDCCH repetition 2, the UE 120 may determine that the counting of resources and ports is to start in association with (e.g., from an end of) reception of the PDCCH repetition 1, which is the first received PDCCH repetition. The UE 120 may determine the CSI during the resource and port occupation duration, and may transmit the CSI report to the BS 110. Further, as discussed below in more detail, the UE 120 may determine that the counting of resources and ports is to end in association with the uplink channel carrying the CSI report. In some aspects, for the aperiodic CSI-RS, resource and port occupation may start from the end of the first PDCCH repetition containing the CSI request.

Figure 7B:
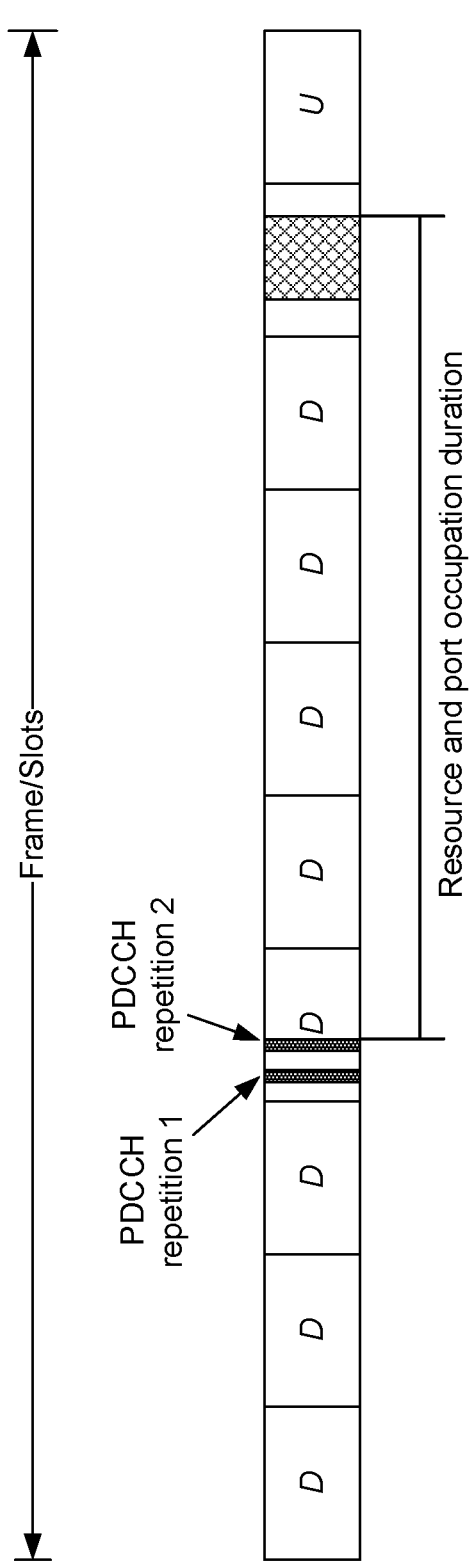

In some aspects, the UE 120 may determine that the counting of resources and ports is to start in association with reception of a last received PDCCH repetition, from among a plurality of received PDCCH repetitions. For instance, in a case where two PDCCH repetitions are received, as shown in FIG. 7B, such that PDCCH repetition 1 is received prior to PDCCH repetition 2, the UE 120 may determine that the counting of resources and ports is to start in association with (e.g., from an end of) reception of the PDCCH repetition 2, which is the last received PDCCH repetition. The UE 120 may determine the CSI during the resource and port occupation duration, and may transmit the CSI report to the BS 110. In this case, the PDCCH repetition 2 is received within the resource and port occupation duration, while PDCCH repetition 1 is received prior to a start of the resource and port occupation timeline. In some aspects, for the aperiodic CSI-RS, resource and port occupation may start from the end of the last PDCCH repetition containing the CSI request. Further, as discussed below in further detail, the UE 120 may determine that the resource and port occupation duration is to end in association with the uplink channel carrying the CSI report.

Figure 7C:
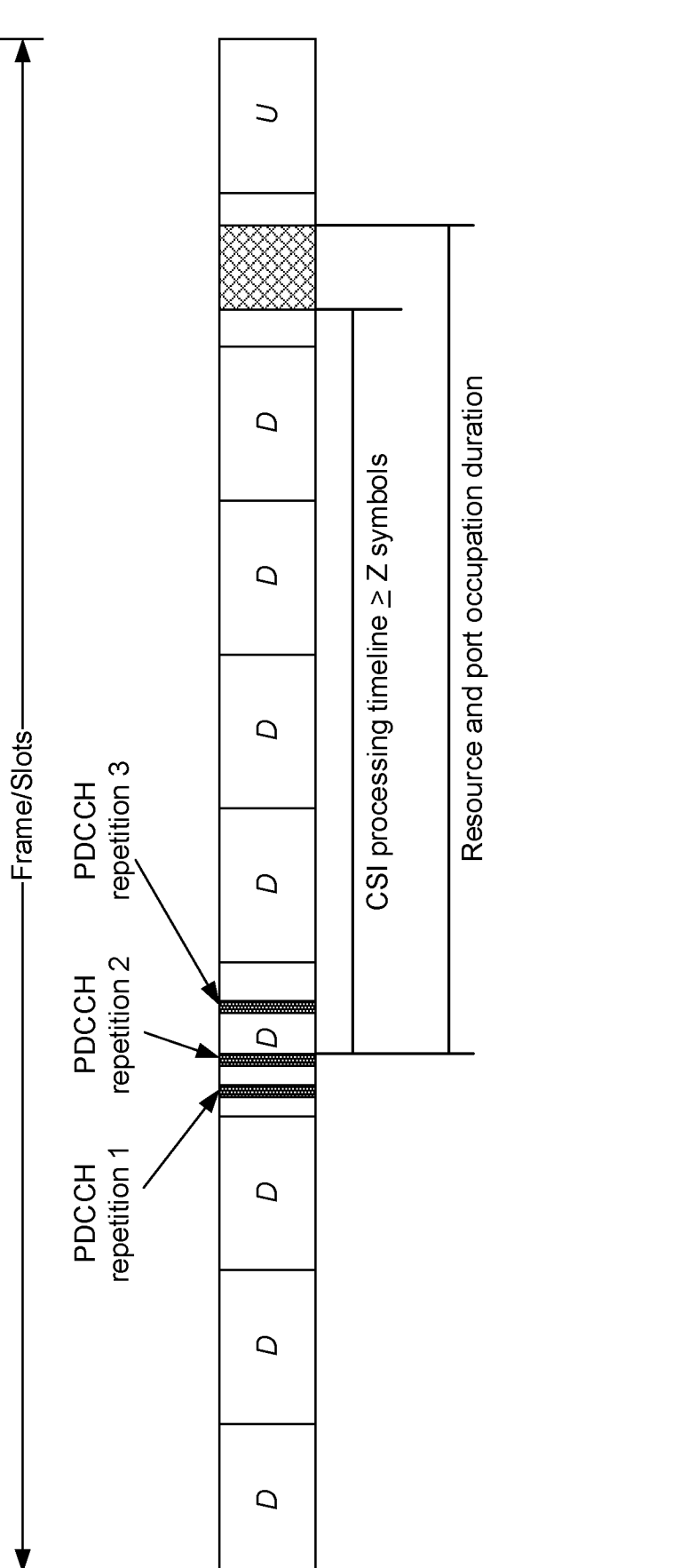

In some aspects, the UE 120 may determine that the counting of resources and ports is to start in association with the reception of a particular received PDCCH repetition, from among a plurality of received PDCCH repetitions. For instance, in a case where three PDCCH repetitions are received, as shown in FIG. 7C, such that PDCCH repetition 1 is received first, PDCCH repetition 2 is received second, and PDCCH repetition 3 is received last, the UE 120 may determine that the counting of resources and ports is to start in association with (e.g., from an end of) reception of the PDCCH repetition 2. In some aspects, the PDCCH repetition 2 may be the last received PDCCH repetition that satisfies the CSI processing timeline. In other words, the PDCCH repetition 2 may be the last received PDCCH repetition such that the duration of time gap from an end of a last OFDM symbol of the PDCCH triggering the CSI report to a first OFDM symbol of a PUSCH carrying the CSI report (also referred to as "the Z timeline") is longer than the duration related to the first quantity (e.g., Z) of symbols. In some aspects, for the aperiodic CSI-RS, resource and port occupation may start from the end of the last PDCCH repetition, that satisfies the Z timeline, containing the CSI request. In the example shown in FIG. 7C, the PDCCH repetition 1 and the PDCCH repetition 2 satisfy the CSI processing timeline, while the PDCCH repetition 3 fails to satisfy the CSI processing timeline. In this case, the CSI processing timeline and the counting of resources and ports may start at substantially the same time. The UE 120 may determine the CSI during the resource and port occupation duration, and may transmit the CSI report. Further, as discussed below in more detail, the UE 120 may determine that the counting of resources and ports is to end in association with the uplink channel carrying the CSI report. In some aspects, for an aperiodic CSI-RS (e.g., A-CSI-RS) used for transmitting the aperiodic CSI report via PUSCH (or PUCCH), the resource and port occupation may end at the end of the scheduled/actual PUSCH (or configured/actual PUCCH) or at the end of last scheduled/actual PUSCH (or last configured/actual PUCCH) repetition containing the report associated with the aperiodic CSI-RS.

In some aspects, when PUCCH/PUSCH repetition is supported, the UE 120 may determine that an end of the resource and port occupation duration (e.g., end of the counting of resources and ports) is associated with the uplink channel carrying the CSI report associated with the aperiodic CSI-RS. With respect to FIGS. 7A-C, when the uplink channel is the PUCCH, the UE 120 may determine that the counting of resources and ports is to end (e.g., that the UE 120 is to release the resources and ports) at an end of a configured PUCCH, or at an end of an actual PUCCH, or at an end of a last configured PUCCH repetition, or at an end of a last actual PUCCH repetition. When the uplink channel is the PUSCH, the UE 120 may determine that the counting of resources and ports is to end (e.g., that the UE 120 is to release the resources and ports) at an end of a scheduled PUSCH, or at an end of an actual PUSCH, or at an end of a last scheduled PUSCH repetition, or at an end of a last actual PUSCH repetition. In some aspects, the UE 120 may configure the UE 120 to release the particular quantity of resources from an end of the resource and port occupation duration.

Figure 8A:
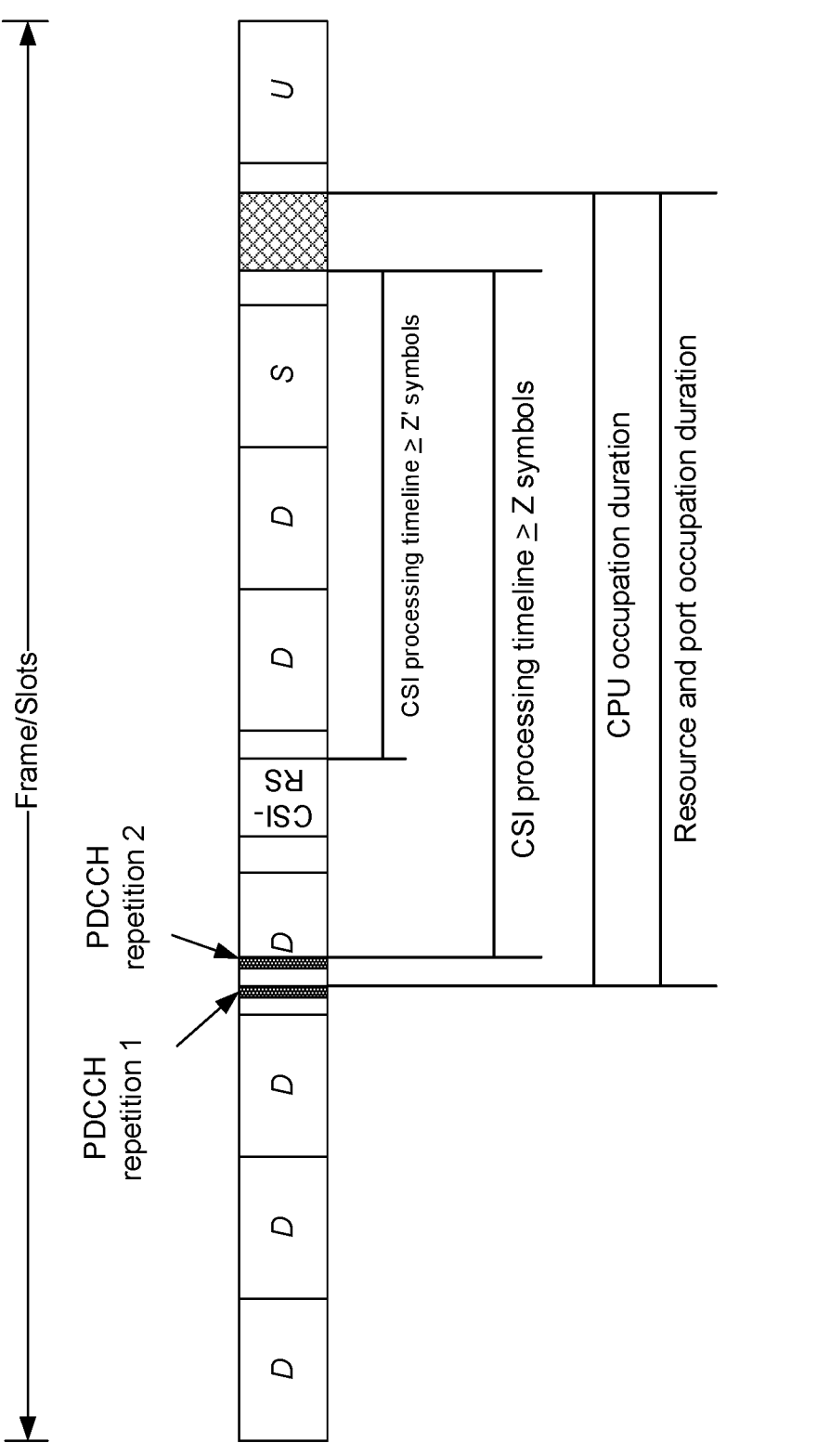
FIGS. 8A-8D are diagrams illustrating examples of determining criteria for reporting channel status information, in accordance with various aspects of the present disclosure.

In some aspects, as shown in FIG. 8A, the UE 120 may determine that PDCCH repetition is supported, while PUCCH/PUSCH repetition is not supported. In a case where two PDCCH repetitions are received, as shown in FIG. 8A, such that PDCCH repetition 1 is received prior to PDCCH repetition 2, the UE 120 may determine that the time gap from an end of a last OFDM symbol of the PDCCH triggering the CSI report to a first OFDM symbol of a PUSCH carrying the CSI report is to start in association with (e.g., from an end of) reception of the PDCCH repetition 2, which is the last received PDCCH repetition. The UE 120 may also determine that the duration of the time gap from an end of a last OFDM symbol of the PDCCH triggering the CSI report to a first OFDM symbol of a PUSCH carrying the CSI report is to end in association with transmission of the uplink channel carrying the CSI report. Further, the UE 120 may determine that the counting of CPU resources and/or the counting of resources and ports is to start in association with (e.g., from an end of) reception of the PDCCH repetition 1, which is the first received PDCCH repetition. Furthermore, the UE 120 may determine that the counting of CPU resources and/or the counting of resources and ports is to end in association with transmission of the uplink channel carrying the CSI report. Based at least in part on determining the above CSI criteria, the UE 120 may determine the CSI and transmit the CSI report to the BS 110.

Figure 8B:
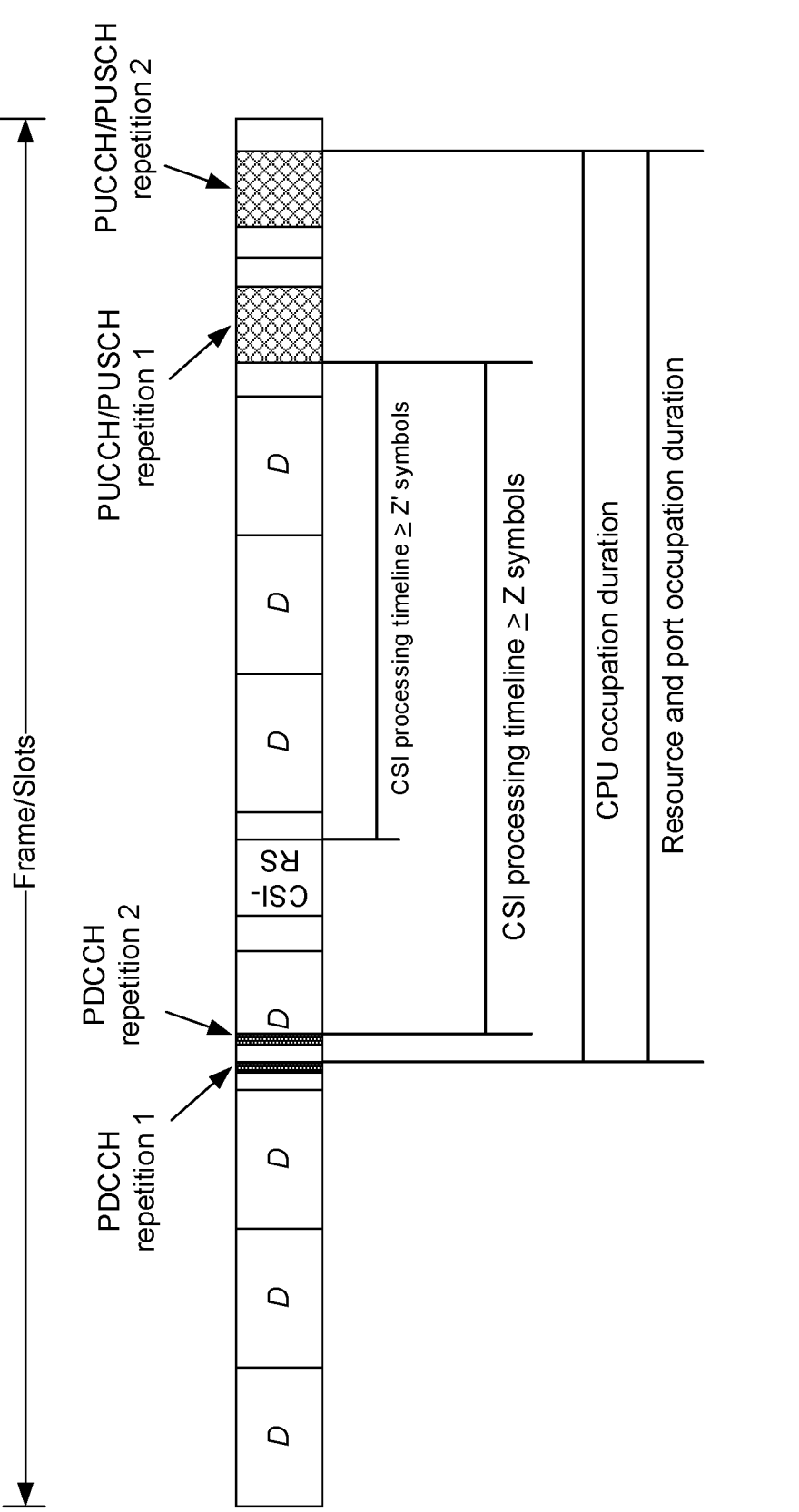

In some aspects, as shown in FIG. 8B, the UE 120 may determine that PDCCH repetition is supported and that PUCCH/PUSCH repetition is supported. In a case where two PDCCH repetitions are received, as shown in FIG. 8B, such that PDCCH repetition 1 is received prior to PDCCH repetition 2, the UE 120 may determine that the time gap from an end of a last OFDM symbol of the PDCCH triggering the CSI report to a first OFDM symbol of a PUSCH carrying the CSI report is to start in association with (e.g., from an end of) reception of the PDCCH repetition 2, which is the last received PDCCH repetition. The UE 120 may also determine that the time gap from an end of a last OFDM symbol of the PDCCH triggering the CSI report to a first OFDM symbol of a PUSCH carrying the CSI report is to end in association with PUCCH/PUSCH repetition 1. Further, the UE 120 may determine that the counting of CPU resources and/or the counting of resources and ports is to start in association with (e.g., from an end of) reception of the PDCCH repetition 1, which is the first received PDCCH repetition. Furthermore, the UE 120 may determine that the counting of CPU resources and/or the counting of resources and ports is to end in association with PUCCH/PUSCH repetition 2. Based at least in part on determining the above CSI criteria, the UE 120 may determine the CSI and transmit the CSI report to the BS 110.

Figure 8C:
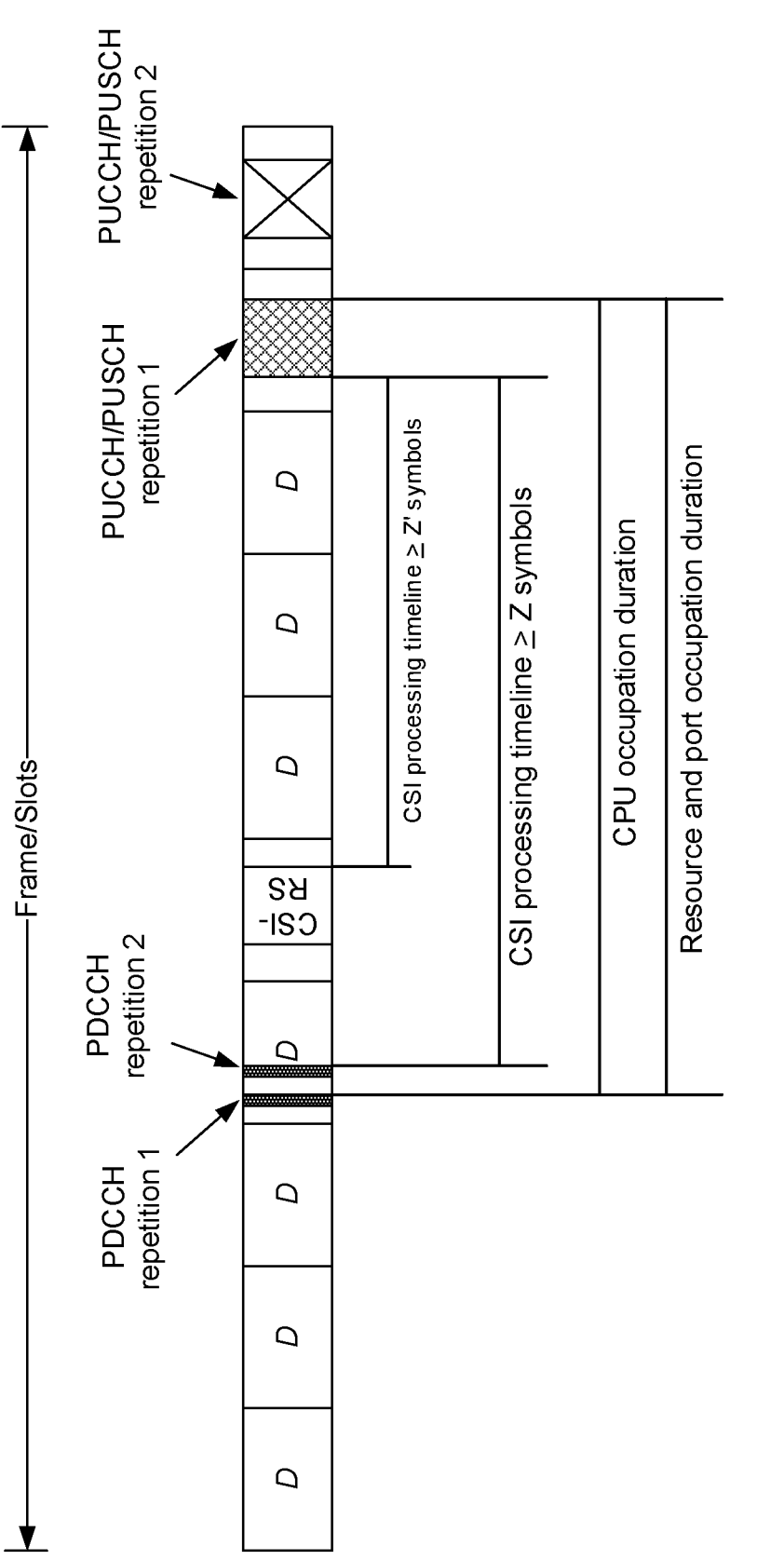

In some aspects, as shown in FIG. 8C, the UE 120 may determine that PDCCH repetition is supported and that PUCCH/PUSCH repetition is supported, however the second PUCCH/PUSCH is cancelled due to collision with other channels. In a case where two PDCCH repetitions are received, as shown in FIG. 8C, such that PDCCH repetition 1 is received prior to PDCCH repetition 2, the UE 120 may determine that the time gap from an end of a last OFDM symbol of the PDCCH triggering the CSI report to a first OFDM symbol of a PUSCH carrying the CSI report is to start in association with (e.g., from an end of) reception of the PDCCH repetition 2, which is the last received PDCCH repetition. The UE 120 may also determine that the time gap from an end of a last OFDM symbol of the PDCCH triggering the CSI report to a first OFDM symbol of a PUSCH carrying the CSI report is to end in association with PUCCH/PUSCH repetition 1. Further, the UE 120 may determine that the counting of CPU resources and/or the counting of resources and ports is to start in association with (e.g., from an end of) reception of the PDCCH repetition 1, which is the first received PDCCH repetition. Furthermore, the UE 120 may determine that the counting of CPU resources and/or the counting of resources and ports is to end in association with PUCCH/PUSCH repetition 1 as it is the last actual PUCCH/PUSCH repetition. Based at least in part on determining the above CSI criteria, the UE 120 may determine the CSI and transmit the CSI report to the BS 110.

Figure 8D:
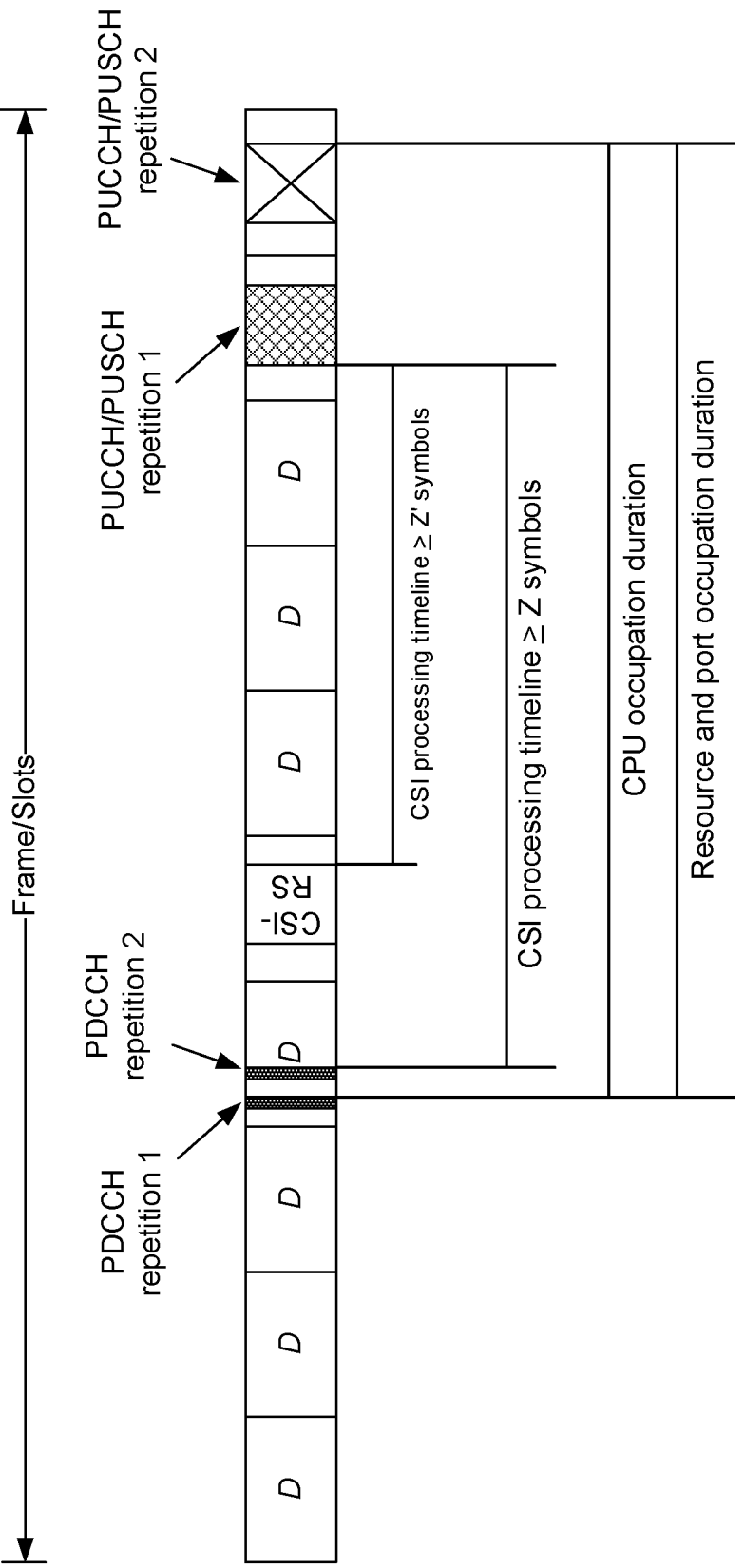

In some aspects, as shown in FIG. 8D, the UE 120 may determine that PDCCH repetition is supported and that PUCCH/PUSCH repetition is supported, however the second PUCCH/PUSCH is cancelled due to collision with other channels. In a case where two PDCCH repetitions are received, as shown in FIG. 8D, such that PDCCH repetition 1 is received prior to PDCCH repetition 2, the UE 120 may determine that the time gap from an end of a last OFDM symbol of the PDCCH triggering the CSI report to a first OFDM symbol of a PUSCH carrying the CSI report is to start in association with (e.g., from an end of) reception of the PDCCH repetition 2, which is the last received PDCCH repetition. The CSI configuration information may also indicate that the time gap from an end of a last OFDM symbol of the PDCCH triggering the CSI report to a first OFDM symbol of a PUSCH carrying the CSI report is to end in association with PUCCH/PUSCH repetition 1. Further, the UE 120 may determine that the counting of CPU resources and/or the counting of resources and ports is to start in association with (e.g., from an end of) reception of the PDCCH repetition 1, which is the first received PDCCH repetition. Furthermore, the UE 120 may determine that the counting of CPU resources and/or the counting of resources and ports is to end in association with PUCCH/PUSCH repetition 2 because it is the last configured PUCCH or the last scheduled PUSCH, which may be the case even though the PUCCH/PUSCH repetition 2 may be canceled due to, for example, a collision with another channel and the PUCCH/PUSCH repetition 1 may become the last actual PUSCH repetition.

In some aspects, the CSI reference resource slot may be a downlink slot including a quantity of PDCCH symbols, DMRS ports, physical downlink shared channel (PDSCH) symbols, or the like. The UE 120 may calculate, as part of determining the CSI, a channel quality indicator (CQI) based at least in part on determining that the CQI is associated with a transport block that is to be included and received in the CSI reference resource slot. Further, when the CSI report is a periodic CSI and/or a semi-persistent CSI, the UE 120 may determine that the UE 120 is to perform the CSI calculations utilizing transmission occasions (e.g., periodic CSI and/or semi-persistent CSI transmission occasions) prior to the location of the CSI reference resource slot. In other words, the UE 120 may determine that the UE 120 is to refrain from using any occasion between the location of the CSI reference resource slot and a slot in which the CSI report is transmitted for performing the CSI calculations.

In some aspects, when PUCCH/PUSCH repetition is supported, the UE 120 may determine that the CSI reference resource slot occurs a given number of slots before an occurrence of a first slot of a first PUCCH repetition or an occurrence of a first slot of a first PUSCH repetition. Additionally, or alternatively, the UE 120 may determine that, when a first scheduled PUCCH/PUSCH repetition is canceled, the CSI reference resource slot occurs a given number of slots before an occurrence of a first actual PUCCH/PUSCH repetition or an occurrence of another scheduled PUCCH/PUSCH repetition. For instance, when the CSI report is the aperiodic CSI report, or the semi-persistent CSI report, or the periodic CSI report, the CSI reference resource slot may occur the given number of slots before an occurrence of a first actual PUCCH repetition or a first configured PUCCH repetition. Similarly, when the CSI report is the aperiodic CSI report or the semi-persistent CSI report, the CSI reference resource slot may occur the given number of slots before an occurrence of a first actual PUSCH repetition or a first scheduled PUSCH repetition. In some aspects, occurrence of a first actual PUCCH repetition may indicate that the second configured PUCCH repetition may have been canceled, and occurrence of a first actual PUSCH repetition may indicate that the second scheduled PUSCH repetition may have been canceled.

In some aspects, for a first actual or configured or scheduled A-CSI reporting on uplink slot n', the CSI reference resource is at slot n-n_ref, where n=floor(n'*2^{mu_DL-mu_UL}) and n_ref is the smallest value >=floor(Z/14) such that it corresponds to a valid downlink slot. In some aspects, for a first actual or configured or scheduled SP/P-CSI reporting on uplink slot n', the CSI reference resource is at slot n-n ref, where n=floor(n' *2^{mu_DL-mu_UL}) and n_n_ref is the smallest value >=4*2^{mu_DL} if there is single CSI reporting or >=5*2^{mu_DL} if there are multiple CSI reportings, such that it corresponds to a valid downlink slot.

By utilizing the determined CSI criteria (also referred to as CSI parameters), as discussed herein, a UE may be enabled to adequately determine when to start the CPU counting and/or resource and port counting associated with performing the channel estimation and when to end CPU counting and/or resource and port counting associated with performing the channel estimation. As a result, the UE may adequately determine the CSI associated with a channel, utilized for data communications between the UE and a BS, and transmit a CSI report including the determined CSI to the BS. Based at least in part on the CSI included in the CSI report, the BS may adequately adapt transmission of downlink communications to current channel conditions and enable the UE to adequately receive the downlink communications. In this way, the UE may be enabled to adequately perform communication operations related to the data communications, and the data communications between the BS and the UE may continue uninterrupted.

As indicated above, FIGS. 4-8D are provided as examples. Other examples may differ from what is described with regard to FIGS. 4-8D.

FIG. 9 is a diagram illustrating an example process 900 performed, for example, by a UE (e.g., UE 120), in accordance with various aspects of the present disclosure. Example process 900 is an example where the UE performs operations associated with determining criteria for reporting channel status information.

As shown in FIG. 9, in some aspects, process 900 may include determining a transmission of a CSI report based at least in part on receiving a CSI request via PDCCH repetitions, or based at least in part on transmitting the CSI report via PUCCH repetitions, or based at least in part on transmitting the CSI report via PUSCH repetitions (block 910). For example, the UE (e.g., using determination component 1008, depicted in FIG. 10) may determine a transmission of a CSI report based at least in part on receiving a CSI request via PDCCH repetitions, or based at least in part on transmitting the CSI report via PUCCH repetitions, or based at least in part on transmitting the CSI report via PUSCH repetitions, as described above.

As further shown in FIG. 9, in some aspects, process 900 may include determining, based at least in part on the determined transmission of the CSI report, CSI processing criteria including one or more of a CSI processing timeline, a CPU occupation duration, a resource and port occupation duration, or a CSI reference resource slot (block 920). For example, the UE (e.g., using determination component 1008, depicted in FIG. 10) may determine, based at least in part on the determined transmission of the CSI report, CSI processing criteria including one or more of a CSI processing timeline, a CPU occupation duration, a resource and port occupation duration, or a CSI reference resource slot, as described above.

As further shown in FIG. 9, in some aspects, process 900 may include selectively transmitting the CSI report based at least in part on the determined CSI processing criteria (block 930). For example, the UE (e.g., using transmission component 1004, depicted in FIG. 10) may selectively transmit the CSI report based at least in part on the determined CSI processing criteria, as described above.

Process 900 may include additional aspects, such as any single aspect or any combination of aspects described below and/or in connection with one or more other processes described elsewhere herein.

In a first aspect, process 900 includes determining whether a duration of the CSI processing timeline, starting at a time associated with the PDCCH repetitions and ending at a time associated with an uplink channel carrying the CSI report, is equal to or greater than a threshold duration when the transmission of the CSI report is determined to be based at least in part on receiving the CSI request via PDCCH repetitions, wherein selectively transmitting the CSI report includes transmitting the CSI report when the duration of the CSI processing timeline is determined to be equal to or greater than the threshold duration.

In a second aspect, alone or in combination with the first aspect, the duration of the CSI processing timeline is to start from an end of a first PDCCH repetition, from among the PDCCH repetitions.

In a third aspect, alone or in combination with the first aspect, the duration of the CSI processing timeline is to start from an end of a last PDCCH repetition, from among the PDCCH repetitions.

In a fourth aspect, alone or in combination with one or more of the first through third aspects, the duration of the CSI processing timeline is to start from an end of a particular PDCCH repetition, from among the PDCCH repetitions.

In a fifth aspect, alone or in combination with one or more of the first through fourth aspects, process 900 includes determining that the CPU occupation duration is to start from an end of a first PDCCH repetition, from among the PDCCH repetitions, when the transmission of the CSI report is determined to be based at least in part on receiving the CSI request via PDCCH repetitions.

In a sixth aspect, alone or in combination with one or more of the first through fourth aspects, process 900 includes determining that the CPU occupation duration is to start from an end of a last PDCCH repetition, from among the PDCCH repetitions, when the transmission of the CSI report is determined to be based at least in part on receiving the CSI request via PDCCH repetitions.

In a seventh aspect, alone or in combination with one or more of the first through sixth aspects, process 900 includes determining that the CPU occupation duration is to start from an end of a last PDCCH repetition, from among the PDCCH repetitions, a duration from the end of the last PDCCH repetition to an uplink channel carrying the CSI report being equal to or greater than a threshold quantity of symbols, when the transmission of the CSI report is determined to be based at least in part on receiving the CSI request via PDCCH repetitions.

In an eighth aspect, alone or in combination with one or more of the first through seventh aspects, process 900 includes determining that the CPU occupation duration is to end in association with a first configured PUCCH repetition, from among the PUCCH repetitions, or a first actual PUCCH repetition, from among the PUCCH repetitions, when the transmission of the CSI report is determined to be based at least in part on transmitting the CSI report via PUCCH repetitions.

In a ninth aspect, alone or in combination with one or more of the first through eighth aspects, process 900 includes determining that the CPU occupation duration is to end in association with a last configured PUCCH repetition, from among the PUCCH repetitions, or a last actual PUCCH repetition, from among the PUCCH repetitions, when the transmission of the CSI report is determined to be based at least in part on transmitting the CSI report via PUCCH repetitions.

In a tenth aspect, alone or in combination with one or more of the first through ninth aspects, process 900 includes determining that the CPU occupation duration is to end in association with a first scheduled PUSCH repetition, from among the PUSCH repetitions, or a first actual PUSCH repetition, from among the PUSCH repetitions, when the transmission of the CSI report is determined to be based at least in part on transmitting the CSI report via PUSCH repetitions.

In an eleventh aspect, alone or in combination with one or more of the first through tenth aspects, process 900 includes determining that the CPU occupation duration is to end in association with a last scheduled PUSCH repetition, from among the PUSCH repetitions, or a last actual PUSCH repetition, from among the PUSCH repetitions, when the transmission of the CSI report is determined to be based at least in part on transmitting the CSI report via PUSCH repetitions.

In a twelfth aspect, alone or in combination with one or more of the first through eleventh aspects, process 900 includes determining that the resource and port occupation duration is to end in association with a first configured PUCCH repetition, from among the PUCCH repetitions, or a first actual PUCCH repetition, from among the PUCCH repetitions, when the transmission of the CSI report is determined to be based at least in part on transmitting the CSI report via PUCCH repetitions.

In a thirteenth aspect, alone or in combination with one or more of the first through twelfth aspects, process 900 includes determining that the resource and port occupation duration is to end in association with a last configured PUCCH repetition, from among the PUCCH repetitions, or a last actual PUCCH repetition, from among the PUCCH repetitions, when the transmission of the CSI report is determined to be based at least in part on transmitting the CSI report via PUCCH repetitions.

In a fourteenth aspect, alone or in combination with one or more of the first through thirteenth aspects, process 900 includes determining that the resource and port occupation duration is to end in association with a first scheduled PUSCH repetition, from among the PUSCH repetitions, or a first actual PUSCH repetition, from among the PUSCH repetitions, when the transmission of the CSI report is determined to be based at least in part on transmitting the CSI report via PUSCH repetitions.

In a fifteenth aspect, alone or in combination with one or more of the first through fourteenth aspects, process 900 includes determining that the resource and report occupation duration is to end in association with a last scheduled PUSCH repetition, from among the PUSCH repetitions, or a last actual PUSCH repetition, from among the PUSCH repetitions, when the transmission of the CSI report is determined to be based at least in part on transmitting the CSI report via PUSCH repetitions.

In a sixteenth aspect, alone or in combination with one or more of the first through fifteenth aspects, process 900 includes determining that the CSI reference resource slot occurs a given number of slots before an occurrence of a first slot of a first PUCCH repetition when the transmission of the CSI report is determined to be based at least in part on transmitting the CSI report via PUCCH repetitions.

In a seventeenth aspect, alone or in combination with one or more of the first through sixteenth aspects, process 900 includes determining that the CSI reference resource slot occurs a given number of slots before an occurrence of a first slot of a first PUSCH repetition when the transmission of the CSI report is determined to be based at least in part on transmitting the CSI report via PUSCH repetitions.

In an eighteenth aspect, alone or in combination with one or more of the first through seventeenth aspects, process 900 includes determining that a first scheduled PUSCH repetition is canceled, and determining that the CSI reference resource slot occurs a given number of slots before an occurrence of a first actual PUSCH repetition or an occurrence of another scheduled PUSCH repetition.

In a nineteenth aspect, alone or in combination with one or more of the first through eighteenth aspects, process 900 includes determining that a first configured PUCCH repetition is canceled, and determining that the CSI reference resource slot occurs a given number of slots before an occurrence of a first actual PUCCH repetition or an occurrence of another configured PUCCH repetition.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
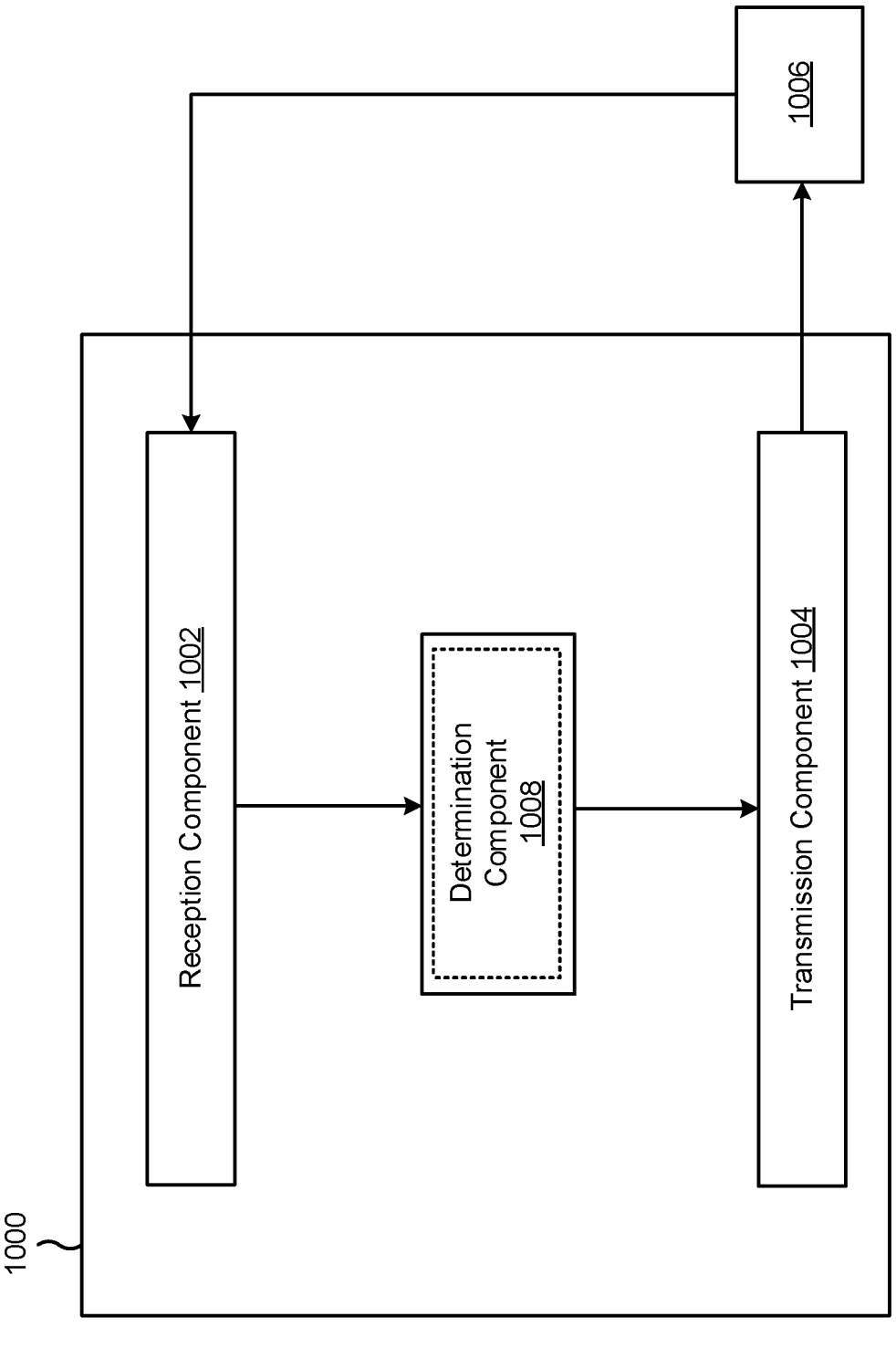
FIG. 10 is a diagram illustrating an example of an apparatus associated with determining criteria for reporting channel status information, in accordance with various aspects of the present disclosure.

FIG. 10 is a block diagram of an example apparatus 1000 for wireless communication. The apparatus 1000 may be a UE (e.g., UE 120), or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a determination component 1008, among other examples.

In some aspects, the apparatus 1000 may be configured to perform one or more operations described herein in connection with FIGS. 3-8D. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE first described above in connection with FIG. 2. In some aspects, the transmission component 1004 may be co-located with the reception component 1002 in a transceiver.

The determination component 1008 may determine a transmission of a CSI report based at least in part on receiving a CSI request via PDCCH repetitions, based at least in part on transmitting the CSI report via PUCCH repetitions, or based at least in part on transmitting the CSI report via PUSCH repetitions. The determination component 1008 may determine, based at least in part on the determined transmission of the CSI report, CSI processing criteria including one or more of a CSI processing timeline, a CPU occupation duration, a resource and port occupation duration, or a CSI reference resource slot. The transmission component 1004 may selectively transmit the CSI report based at least in part on the determined CSI processing criteria.

The determination component 1008 may determine whether a duration of the CSI processing timeline, starting at a time associated with the PDCCH repetitions and ending at a time associated with an uplink channel carrying the CSI report, is equal to or greater than a threshold duration when the transmission of the CSI report is determined to be based at least in part on receiving the CSI request via PDCCH repetitions, wherein.

The transmission component 1004 may selectively transmit the CSI report includes transmitting the CSI report when the duration of the CSI processing timeline is determined to be equal to or greater than the threshold duration.

The determination component 1008 may determine that the CPU occupation duration is to start from an end of a first PDCCH repetition, from among the PDCCH repetitions, when the transmission of the CSI report is determined to be based at least in part on receiving the CSI request via PDCCH repetitions.

The determination component 1008 may determine that the CPU occupation duration is to start from an end of a last PDCCH repetition, from among the PDCCH repetitions, when the transmission of the CSI report is determined to be based at least in part on receiving the CSI request via PDCCH repetitions.

The determination component 1008 may determine that the CPU occupation duration is to start from an end of a last PDCCH repetition, from among the PDCCH repetitions, a duration from the end of the last PDCCH repetition to an uplink channel carrying the CSI report being equal to or greater than a threshold quantity of symbols, when the transmission of the CSI report is determined to be based at least in part on receiving the CSI request via PDCCH repetitions.

The determination component 1008 may determine that the CPU occupation duration is to end in association with a first configured PUCCH repetition, from among the PUCCH repetitions, or a first actual PUCCH repetition, from among the PUCCH repetitions, when the transmission of the CSI report is determined to be based at least in part on transmitting the CSI report via PUCCH repetitions.

The determination component 1008 may determine that the CPU occupation duration is to end in association with a last configured PUCCH repetition, from among the PUCCH repetitions, or a last actual PUCCH repetition, from among the PUCCH repetitions, when the transmission of the CSI report is determined to be based at least in part on transmitting the CSI report via PUCCH repetitions.

The determination component 1008 may determine that the CPU occupation duration is to end in association with a first scheduled PUSCH repetition, from among the PUSCH repetitions, or a first actual PUSCH repetition, from among the PUSCH repetitions, when the transmission of the CSI report is determined to be based at least in part on transmitting the CSI report via PUSCH repetitions.

The determination component 1008 may determine that the CPU occupation duration is to end in association with a last scheduled PUSCH repetition, from among the PUSCH repetitions, or a last actual PUSCH repetition, from among the PUSCH repetitions, when the transmission of the CSI report is determined to be based at least in part on transmitting the CSI report via PUSCH repetitions.

The determination component 1008 may determine that the resource and port occupation duration is to end in association with a first configured PUCCH repetition, from among the PUCCH repetitions, or a first actual PUCCH repetition, from among the PUCCH repetitions, when the transmission of the CSI report is determined to be based at least in part on transmitting the CSI report via PUCCH repetitions.

The determination component 1008 may determine that the resource and port occupation duration is to end in association with a last configured PUCCH repetition, from among the PUCCH repetitions, or a last actual PUCCH repetition, from among the PUCCH repetitions, when the transmission of the CSI report is determined to be based at least in part on transmitting the CSI report via PUCCH repetitions.

The determination component 1008 may determine that the resource and port occupation duration is to end in association with a first scheduled PUSCH repetition, from among the PUSCH repetitions, or a first actual PUSCH repetition, from among the PUSCH repetitions, when the transmission of the CSI report is determined to be based at least in part on transmitting the CSI report via PUSCH repetitions.

The determination component 1008 may determine that the resource and report occupation duration is to end in association with a last scheduled PUSCH repetition, from among the PUSCH repetitions, or a last actual PUSCH repetition, from among the PUSCH repetitions, when the transmission of the CSI report is determined to be based at least in part on transmitting the CSI report via PUSCH repetitions.

The determination component 1008 may determine that the CSI reference resource slot occurs a given number of slots before an occurrence of a first slot of a first PUCCH repetition when the transmission of the CSI report is determined to be based at least in part on transmitting the CSI report via PUCCH repetitions.

The determination component 1008 may determine that the CSI reference resource slot occurs a given number of slots before an occurrence of a first slot of a first PUSCH repetition when the transmission of the CSI report is determined to be based at least in part on transmitting the CSI report via PUSCH repetitions.

The determination component 1008 may determine that a first scheduled PUSCH repetition is canceled.

The determination component 1008 may determine that the CSI reference resource slot occurs a given number of slots before an occurrence of a first actual PUSCH repetition or an occurrence of another scheduled PUSCH repetition.

The determination component 1008 may determine that a first configured PUCCH repetition is canceled.

The determination component 1008 may determine that the CSI reference resource slot occurs a given number of slots before an occurrence of a first actual PUCCH repetition or an occurrence of another configured PUCCH repetition.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some aspects of the present disclosure:

Aspect 1: A method for wireless communication performed by a user equipment (UE), comprising: determining a transmission of a channel status information (CSI) report based at least in part on receiving a CSI request via physical downlink control channel (PDCCH) repetitions, based at least in part on transmitting the CSI report via physical uplink control channel (PUCCH) repetitions, or based at least in part on transmitting the CSI report via physical uplink shared channel (PUSCH) repetitions; determining, based at least in part on the determined transmission of the CSI report, CSI processing criteria including one or more of a CSI processing timeline, a CSI processing unit (CPU) occupation duration, a resource and port occupation duration, or a CSI reference resource slot; and selectively transmitting the CSI report based at least in part on the determined CSI processing criteria.

Aspect 2: The method of aspect 1, further comprising: determining whether a duration of the CSI processing timeline, starting at a time associated with the PDCCH repetitions and ending at a time associated with an uplink channel carrying the CSI report, is equal to or greater than a threshold duration when the transmission of the CSI report is determined to be based at least in part on receiving the CSI request via PDCCH repetitions, wherein selectively transmitting the CSI report includes transmitting the CSI report when the duration of the CSI processing timeline is determined to be equal to or greater than the threshold duration.

Aspect 3: The method of any of aspects 1-2, wherein the duration of the CSI processing timeline is to start from an end of a first PDCCH repetition, from among the PDCCH repetitions.

Aspect 4: The method of any of aspects 1-2, wherein the duration of the CSI processing timeline is to start from an end of a last PDCCH repetition, from among the PDCCH repetitions.

Aspect 5: The method of any of aspects 1-4, wherein the duration of the CSI processing timeline is to start from an end of a particular PDCCH repetition, from among the PDCCH repetitions.

Aspect 6: The method of any of aspects 1-5, further comprising: determining that the CPU occupation duration is to start from an end of a first PDCCH repetition, from among the PDCCH repetitions, when the transmission of the CSI report is determined to be based at least in part on receiving the CSI request via PDCCH repetitions.

Aspect 7: The method of any of aspects 1-5, further comprising: determining that the CPU occupation duration is to start from an end of a last PDCCH repetition, from among the PDCCH repetitions, when the transmission of the CSI report is determined to be based at least in part on receiving the CSI request via PDCCH repetitions.

Aspect 8: The method of any of aspects 1-7, further comprising: determining that the CPU occupation duration is to start from an end of a last PDCCH repetition, from among the PDCCH repetitions, a duration from the end of the last PDCCH repetition to an uplink channel carrying the CSI report being equal to or greater than a threshold quantity of symbols, when the transmission of the CSI report is determined to be based at least in part on receiving the CSI request via PDCCH repetitions.

Aspect 9: The method of any of aspects 1-9, further comprising: determining that the CPU occupation duration is to end in association with a first configured PUCCH repetition, from among the PUCCH repetitions, or a first actual PUCCH repetition, from among the PUCCH repetitions, when the transmission of the CSI report is determined to be based at least in part on transmitting the CSI report via PUCCH repetitions.

Aspect 10: The method of any of aspects 1-9, further comprising: determining that the CPU occupation duration is to end in association with a last configured PUCCH repetition, from among the PUCCH repetitions, or a last actual PUCCH repetition, from among the PUCCH repetitions, when the transmission of the CSI report is determined to be based at least in part on transmitting the CSI report via PUCCH repetitions.

Aspect 11: The method of any of aspects 1-10, further comprising: determining that the CPU occupation duration is to end in association with a first scheduled PUSCH repetition, from among the PUSCH repetitions, or a first actual PUSCH repetition, from among the PUSCH repetitions, when the transmission of the CSI report is determined to be based at least in part on transmitting the CSI report via PUSCH repetitions.

Aspect 12: The method of any of aspects 1-11, further comprising: determining that the CPU occupation duration is to end in association with a last scheduled PUSCH repetition, from among the PUSCH repetitions, or a last actual PUSCH repetition, from among the PUSCH repetitions, when the transmission of the CSI report is determined to be based at least in part on transmitting the CSI report via PUSCH repetitions.

Aspect 13: The method of any of aspects 1-12, further comprising: determining that the resource and port occupation duration is to end in association with a first configured PUCCH repetition, from among the PUCCH repetitions, or a first actual PUCCH repetition, from among the PUCCH repetitions, when the transmission of the CSI report is determined to be based at least in part on transmitting the CSI report via PUCCH repetitions.

Aspect 14: The method of any of aspects 1-13, further comprising: determining that the resource and port occupation duration is to end in association with a last configured PUCCH repetition, from among the PUCCH repetitions, or a last actual PUCCH repetition, from among the PUCCH repetitions, when the transmission of the CSI report is determined to be based at least in part on transmitting the CSI report via PUCCH repetitions.

Aspect 15: The method of any of aspects 1-14, further comprising: determining that the resource and port occupation duration is to end in association with a first scheduled PUSCH repetition, from among the PUSCH repetitions, or a first actual PUSCH repetition, from among the PUSCH repetitions, when the transmission of the CSI report is determined to be based at least in part on transmitting the CSI report via PUSCH repetitions.

Aspect 16: The method of any of aspects 1-15, further comprising: determining that the resource and report occupation duration is to end in association with a last scheduled PUSCH repetition, from among the PUSCH repetitions, or a last actual PUSCH repetition, from among the PUSCH repetitions, when the transmission of the CSI report is determined to be based at least in part on transmitting the CSI report via PUSCH repetitions.

Aspect 17: The method of any of aspects 1-16, further comprising: determining that the CSI reference resource slot occurs a given number of slots before an occurrence of a first slot of a first PUCCH repetition when the transmission of the CSI report is determined to be based at least in part on transmitting the CSI report via PUCCH repetitions.

Aspect 18: The method of any of aspects 1-17, further comprising: determining that the CSI reference resource slot occurs a given number of slots before an occurrence of a first slot of a first PUSCH repetition when the transmission of the CSI report is determined to be based at least in part on transmitting the CSI report via PUSCH repetitions.

Aspect 19: The method of any of aspects 1-18, further comprising: determining that a first scheduled PUSCH repetition is canceled; and determining that the CSI reference resource slot occurs a given number of slots before an occurrence of a first actual PUSCH repetition or an occurrence of another scheduled PUSCH repetition.

Aspect 20: The method of any of aspects 1-19, further comprising: determining that a first configured PUCCH repetition is canceled; and determining that the CSI reference resource slot occurs a given number of slots before an occurrence of a first actual PUCCH repetition or an occurrence of another configured PUCCH repetition.

Aspect 21: An apparatus for wireless communication at a device, comprising a processor; memory coupled with the processor; and instructions stored in the memory and executable by the processor to cause the apparatus to perform the method of one or more aspects of aspects 1-20.

Aspect 22: A device for wireless communication, comprising a memory and one or more processors coupled to the memory, the memory and the one or more processors configured to perform the method of one or more aspects of aspects 1-20.

Aspect 23: An apparatus for wireless communication, comprising at least one means for performing the method of one or more aspects of aspects 1-20.

Aspect 24: A non-transitory computer-readable medium storing code for wireless communication, the code comprising instructions executable by a processor to perform the method of one or more aspects of aspects 1-20.

Aspect 25: A non-transitory computer-readable medium storing a set of instructions for wireless communication, the set of instructions comprising one or more instructions that, when executed by one or more processors of a device, cause the device to perform the method of one or more aspects of aspects 1-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for wireless communication performed by a user equipment (UE), comprising:

determining a transmission of a channel status information (CSI) report based at least in part on receiving a CSI request via physical downlink control channel (PDCCH) repetitions, based at least in part on transmitting the CSI report via physical uplink control channel (PUCCH) repetitions, or based at least in part on transmitting the CSI report via physical uplink shared channel (PUSCH) repetitions;

determining, based at least in part on the determined transmission of the CSI report, CSI processing criteria including one or more of a CSI processing timeline, a CSI processing unit (CPU) occupation duration, a resource and port occupation duration, or a CSI reference resource slot;

determining whether a duration of the CSI processing timeline, starting at a time associated with the PDCCH repetitions and ending at a time associated with an uplink channel carrying the CSI report, is equal to or greater than a threshold duration when the transmission of the CSI report is determined to be based at least in part on receiving the CSI request via PDCCH repetitions; and selectively transmitting the CSI report based at least in part on the CSI processing criteria, when the duration of the CSI processing timeline is determined to be equal to or greater than the threshold duration.

2. The method of claim 1, wherein the duration of the CSI processing timeline is to start from an end of a first PDCCH repetition, from among the PDCCH repetitions.

3. The method of claim 1, wherein the duration of the CSI processing timeline is to start from an end of a last PDCCH repetition, from among the PDCCH repetitions.

4. The method of claim 1, wherein the duration of the CSI processing timeline is to start from an end of a particular PDCCH repetition, from among the PDCCH repetitions.

5. The method of claim 1, further comprising:

determining that the CPU occupation duration is to start from an end of a first PDCCH repetition, from among the PDCCH repetitions, when the transmission of the CSI report is determined to be based at least in part on receiving the CSI request via PDCCH repetitions.

6. The method of claim 1, further comprising:

determining that the CPU occupation duration is to start from an end of a last PDCCH repetition, from among the PDCCH repetitions, when the transmission of the CSI report is determined to be based at least in part on receiving the CSI request via PDCCH repetitions.

7. The method of claim 1, further comprising:

determining that the CPU occupation duration is to start from an end of a last PDCCH repetition, from among the PDCCH repetitions, a duration from the end of the last PDCCH repetition to an uplink channel carrying the CSI report being equal to or greater than a threshold quantity of symbols, when the transmission of the CSI report is determined to be based at least in part on receiving the CSI request via PDCCH repetitions.

8. The method of claim 1, further comprising:

determining that the CPU occupation duration is to end in association with a first configured PUCCH repetition, from among the PUCCH repetitions, or a first actual PUCCH repetition, from among the PUCCH repetitions, when the transmission of the CSI report is determined to be based at least in part on transmitting the CSI report via PUCCH repetitions.

9. The method of claim 1, further comprising:

determining that the CPU occupation duration is to end in association with a last configured PUCCH repetition, from among the PUCCH repetitions, or a last actual PUCCH repetition, from among the PUCCH repetitions, when the transmission of the CSI report is determined to be based at least in part on transmitting the CSI report via PUCCH repetitions.

10. The method of claim 1, further comprising:

determining that the CPU occupation duration is to end in association with a first scheduled PUSCH repetition, from among the PUSCH repetitions, or a first actual PUSCH repetition, from among the PUSCH repetitions, when the transmission of the CSI report is determined to be based at least in part on transmitting the CSI report via PUSCH repetitions.

11. The method of claim 1, further comprising:
determining that the CPU occupation duration is to end in association with a last scheduled PUSCH repetition, from among the PUSCH repetitions, or a last actual PUSCH repetition, from among the PUSCH repetitions, when the transmission of the CSI report is determined to be based at least in part on transmitting the CSI report via PUSCH repetitions.

12. The method of claim 1, further comprising:
determining that the resource and port occupation duration is to end in association with a first configured PUCCH repetition, from among the PUCCH repetitions, or a first actual PUCCH repetition, from among the PUCCH repetitions, when the transmission of the CSI report is determined to be based at least in part on transmitting the CSI report via PUCCH repetitions.

13. The method of claim 1, further comprising:
determining that the resource and port occupation duration is to end in association with a last configured PUCCH repetition, from among the PUCCH repetitions, or a last actual PUCCH repetition, from among the PUCCH repetitions, when the transmission of the CSI report is determined to be based at least in part on transmitting the CSI report via PUCCH repetitions.

14. The method of claim 1, further comprising:
determining that the resource and port occupation duration is to end in association with a first scheduled PUSCH repetition, from among the PUSCH repetitions, or a first actual PUSCH repetition, from among the PUSCH repetitions, when the transmission of the CSI report is determined to be based at least in part on transmitting the CSI report via PUSCH repetitions.

15. The method of claim 1, further comprising:
determining that the resource and report occupation duration is to end in association with a last scheduled PUSCH repetition, from among the PUSCH repetitions, or a last actual PUSCH repetition, from among the PUSCH repetitions, when the transmission of the CSI report is determined to be based at least in part on transmitting the CSI report via PUSCH repetitions.

16. The method of claim 1, further comprising:
determining that the CSI reference resource slot occurs a given number of slots before an occurrence of a first slot of a first PUCCH repetition when the transmission of the CSI report is determined to be based at least in part on transmitting the CSI report via PUCCH repetitions.

17. The method of claim 1, further comprising:
determining that the CSI reference resource slot occurs a given number of slots before an occurrence of a first slot of a first PUSCH repetition when the transmission of the CSI report is determined to be based at least in part on transmitting the CSI report via PUSCH repetitions.

18. The method of claim 1, further comprising:
determining that a first scheduled PUSCH repetition is canceled; and
determining that the CSI reference resource slot occurs a given number of slots before an occurrence of a first actual PUSCH repetition or an occurrence of another scheduled PUSCH repetition.

19. The method of claim 1, further comprising:
determining that a first configured PUCCH repetition is canceled; and determining that the CSI reference resource slot occurs a given number of slots before an occurrence of a first actual PUCCH repetition or an occurrence of another configured PUCCH repetition.

20. A user equipment (UE) for wireless communication, comprising:
a memory; and
one or more processors operatively coupled to the memory, the memory and the one or more processors configured to:
determine a transmission of a channel status information (CSI) report based at least in part on receiving a CSI request via physical downlink control channel (PDCCH) repetitions, based at least in part on transmitting the CSI report via physical uplink control channel (PUCCH) repetitions, or based at least in part on transmitting the CSI report via physical uplink shared channel (PUSCH) repetitions;
determine, based at least in part on the determined transmission of the CSI report, CSI processing criteria including one or more of a CSI processing timeline, a CSI processing unit (CPU) occupation duration, a resource and port occupation duration, or a CSI reference resource slot;
determine whether a duration of the CSI processing timeline, starting at a time associated with the PDCCH repetitions and ending at a time associated with an uplink channel carrying the CSI report, is equal to or greater than a threshold duration when the transmission of the CSI report is determined to be based at least in part on receiving the CSI request via PDCCH repetitions; and
selectively transmit the CSI report based at least in part on the CSI processing criteria, when the duration of the CSI processing timeline is determined to be equal to or greater than the threshold duration.

21. The UE of claim 20, wherein the duration of the CSI processing timeline is to start from an end of a first PDCCH repetition, from among the PDCCH repetitions.

22. The UE of claim 20, wherein the duration of the CSI processing timeline is to start from an end of a last PDCCH repetition, from among the PDCCH repetitions.

23. The UE of claim 20, wherein the duration of the CSI processing timeline is to start from an end of a particular PDCCH repetition, from among the PDCCH repetitions.

24. The UE of claim 20, wherein the one or more processors are further configured to:
determine that the CPU occupation duration is to start in association with a particular PDCCH repetition, from among the PDCCH repetitions, when the transmission of the CSI report is determined to be based at least in part on receiving the CSI request via PDCCH repetitions.

25. The UE of claim 20, wherein the one or more processors are further configured to:
determine that the CPU occupation duration is to end in association with a particular PUCCH repetition, from among the PUCCH repetitions, when the transmission of the CSI report is determined to be based at least in part on transmitting the CSI report via PUCCH repetitions, or
determine that the CPU occupation duration is to end in association with a particular PUSCH repetition, from among the PUSCH repetitions, when the transmission of the CSI report is determined to be based at least in part on transmitting the CSI report via PUSCH repetitions.

26. The UE of claim 20, wherein the one or more processors are further configured to:

determine that the resource and port occupation duration is to start in association with a particular PDCCH repetition, from among the PDCCH repetitions, when the transmission of the CSI report is determined to be based at least in part on receiving the CSI request via PDCCH repetitions.

27. A non-transitory computer-readable medium storing a set of instructions for wireless communication, the set of instructions comprising:

one or more instructions that, when executed by one or more processors of a user equipment (UE), cause the UE to:

determine a transmission of a channel status information (CSI) report based at least in part on receiving a CSI request via physical downlink control channel (PDCCH) repetitions, based at least in part on transmitting the CSI report via physical uplink control channel (PUCCH) repetitions, or based at least in part on transmitting the CSI report via physical uplink shared channel (PUSCH) repetitions;

determine, based at least in part on the determined transmission of the CSI report, CSI processing criteria including one or more of a CSI processing timeline, a CSI processing unit (CPU) occupation duration, a resource and port occupation duration, or a CSI reference resource slot;

determine whether a duration of the CSI processing timeline, starting at a time associated with the PDCCH repetitions and ending at a time associated with an uplink channel carrying the CSI report, is equal to or greater than a threshold duration when the transmission of the CSI report is determined to be based at least in part on receiving the CSI request via PDCCH repetitions; and selectively transmit the CSI report based at least in part on the CSI processing criteria, when the duration of the CSI processing timeline is determined to be equal to or greater than the threshold duration.

28. An apparatus for wireless communication, comprising:

means for determining a transmission of a channel status information (CSI) report based at least in part on receiving a CSI request via physical downlink control channel (PDCCH) repetitions, based at least in part on transmitting the CSI report via physical uplink control channel (PUCCH) repetitions, or based at least in part on transmitting the CSI report via physical uplink shared channel (PUSCH) repetitions;

means for determining, based at least in part on the determined transmission of the CSI report, CSI processing criteria including one or more of a CSI processing timeline, a CSI processing unit (CPU) occupation duration, a resource and port occupation duration, or a CSI reference resource slot;

means for determining whether a duration of the CSI processing timeline, starting at a time associated with the PDCCH repetitions and ending at a time associated with an uplink channel carrying the CSI report, is equal to or greater than a threshold duration when the transmission of the CSI report is determined to be based at least in part on receiving the CSI request via PDCCH repetitions; and means for selectively transmitting the CSI report based at least in part on the CSI processing criteria, when the duration of the CSI processing timeline is determined to be equal to or greater than the threshold duration.

* * * * *